(12) United States Patent
Zhang

(10) Patent No.: US 11,796,323 B2
(45) Date of Patent: Oct. 24, 2023

(54) SYSTEM AND METHOD FOR GENERATING FEATURE LINE DATA FOR A MAP

(71) Applicant: HERE Global B.V., Eindhoven (NL)

(72) Inventor: Zhenhua Zhang, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 136 days.

(21) Appl. No.: 17/210,125

(22) Filed: Mar. 23, 2021

(65) Prior Publication Data

US 2022/0307841 A1 Sep. 29, 2022

(51) Int. Cl.
| | | |
|---|---|---|
| G01C 21/32 | (2006.01) | |
| G01C 21/34 | (2006.01) | |
| G01C 21/36 | (2006.01) | |
| G06V 20/56 | (2022.01) | |
| G06F 18/22 | (2023.01) | |

(52) U.S. Cl.
CPC ......... *G01C 21/32* (2013.01); *G01C 21/3446* (2013.01); *G01C 21/3461* (2013.01); *G01C 21/3602* (2013.01); *G06F 18/22* (2023.01); *G06V 20/588* (2022.01)

(58) Field of Classification Search
CPC .............. G01C 21/32; G01C 21/3446; G01C 21/3461; G01C 21/3602; G01C 21/3815; G01C 21/3848; G06F 18/22; G06V 20/588

See application file for complete search history.

(56) References Cited

U.S. PATENT DOCUMENTS

| | | | |
|---|---|---|---|
| 7,295,683 B2 | 11/2007 | Yamamoto et al. | |
| 9,245,188 B2 | 1/2016 | Han | |
| 9,384,394 B2 | 7/2016 | Joshi et al. | |
| 10,317,231 B2 | 6/2019 | Ferenez et al. | |
| 2020/0193173 A1 | 6/2020 | Zhang et al. | |
| 2020/0393265 A1* | 12/2020 | Piao .................... | G01C 21/3815 |
| 2021/0001877 A1* | 1/2021 | Han .................... | G01C 21/3822 |

OTHER PUBLICATIONS

Wen et al., "A Deep Learning Framework for Road Marking Extraction, Classification and Completion from Mobile Laser Scanning Point Clouds", ISPRS Journal of Photogrammetry and Remote Sensing, vol. 147, Jan. 2019, pp. 178-192.

Li et al., "Lane Marking Detection and Reconstruction with Line-Scan Imaging Data", Published: May 20, 2018, 22 pages.

* cited by examiner

*Primary Examiner* — Rami Khatib
(74) *Attorney, Agent, or Firm* — Peter H. Yu; HERE GLOBAL B.V.

(57) ABSTRACT

A system is disclosed for generating a feature line, such as for lane marking data of a map database. The system, for example, determines connectivity data for the feature line based on at least one first point of the feature line and at least one second line, which is within a maximum distance from the at least one first point. Further, orientation data associated with the at least one first point and at least one second point associated with the at least one second line is generated, in response to determining the connectivity data for the feature line. Further, distance data associated with distance between the at least one first point and the at least one second point is determined to generate a connecting line for the feature line based on the at least one first point, the at least one second point, the orientation data and the distance data.

12 Claims, 12 Drawing Sheets

SYSTEM AND METHOD FOR GENERATING FEATURE LINE DATA FOR A MAP

TECHNOLOGICAL FIELD

The present disclosure generally relates to generating feature lines in map databases, and more particularly relates to generating feature lines of lane markings in map databases.

BACKGROUND

Navigation applications for a vehicle generally rely on data stored in a map database for identifying various navigation related entities such as road objects, links, lane markings, road segments, road geometries and the like. In case the vehicle is an autonomous vehicle, accurate detection of navigation related entities becomes more important to provide a safe and reliable navigation service. However, sometimes the data stored in the map database may be incomplete due to many reasons. These may include such as errors in data collection, less frequent data updating in the map database, presence of obstructions during data collection, specifically for image based data, or difficult to detect data. In such cases it is imperative to supplement the conventional methods of data collection with additional methods and systems.

Therefore, there is a need to have updated and accurate map data related to various navigation entities, for provision of accurate navigation services.

BRIEF SUMMARY OF SOME EXAMPLE EMBODIMENTS

In case of modern day navigation services which are based on high definition maps and real-time data for depicting map data with greater clarity and detail on superior in-vehicle user interfaces, it becomes even more critical to depict information of navigation related entities and their attributes with accuracy, clarity and precision. Further, with reliance of data collection technologies for map data (like for high definition maps) on a plurality of data sources such as sensors, satellite imagery, ground truth vehicles and the like, likelihood of errors due to different types of data sources and presence of false positives and false negatives in collected data need to be tackled with precision. For example, in the case of map data related to lane markings, there may be reliance on data sources with image recognition capabilities for detecting lane markings. These data sources may include vehicle sensors or cameras and satellite images detecting lanes markings. Sometimes there may be errors in detecting correct lane markings in these data sources due to a number of reasons, including but not limited to: malfunctioning in a detection component, partial occlusion of the lane markings by nearby trees or nearby vehicles, faded lane markings on a link, and the like. These errors in turn lead to incomplete and discontinuous data related to the lane markings. The lane markings may be depicted by feature lines on a mapping interface, such as on the high definition map, which are shown as discontinuous or dashed or dotted feature lines on the mapping interface when there is some missing data due to errors. This may pose serious problems in navigation of vehicles. Specifically, in case of autonomous vehicles, the problem may become graver if accurate lane marking detection and corresponding information is not provided in real-time, leading to delayed navigation decision and may even cause accidents.

In order to solve the foregoing problem, the present disclosure may provide systems and methods that help to generate a feature line associated with lane marking data of map databases, by completing the missing parts of the feature line based on intelligent detection mechanisms. The methods and systems provide techniques for complementing the sensor data and map data with advanced detection algorithms so that missing parts in feature lines of lane marking data may be completed and accurate lane marking data and/or map data may then be used in various navigation applications to provide reliable, safe, and accurate navigation. Further, the updated map data may aid in avoiding unwanted conditions such as road accidents, head-on collisions of vehicles, fatalities, and the like.

Various embodiments are provided herein for generating the feature line which may have missing parts, and the feature line may be related to lane marking data of a map database. The generation of feature line may encompass completing the incomplete feature line by generating a connecting line for the incomplete feature line. The connecting line may be formed between border points of disconnected parts of the feature line. The disconnected parts of the feature line may be identified based on an unsupervised process using distance and orientation features of the disconnected parts of the feature line. The orientation may be defined in terms of heading data for border points of the disconnected parts of the feature line. These disconnected parts may form disconnected lane marking data for lanes in vicinity or within a maximum distance of each other. Out of a number of lanes in vicinity of the feature line under observation, qualified consecutive lane pairs may be identified based on the distance and orientations features discussed above. Once qualified lane pairs are obtained, they may be connected by forming a line segment in place of the missing part, and the feature line may be completed.

Thus, as disclosed herein, the methods and systems describing the unsupervised process disclosed in various embodiments, does not need to rely on map data extraction to complete the missing parts of the feature line. Therefore, the methods and systems provide faster and efficient mechanisms to generate complete feature line data, and subsequently use this completed data in navigation applications. This is highly advantageous especially in the case of autonomous vehicles, which benefit from getting accurate, complete, and up-to-data lane data in real-time. This further ensures faster decision making while driving and thus, safer, and reliable navigation. Even in the case of semi-autonomous or manually driven vehicles, the correct, up-to-date, and complete data ensures better and reliable navigation. Further, the completed lane data may be used to update the map database and thus improve the quality of the map data, by reducing false negatives (and false positives) related to lane data detection and closing of the gaps for discontinuous lane marking parts, which is helpful for all navigation services provided by using the map database A system, a method and a computer programmable product are provided for implementing the unsupervised process for lane marking data generation by completing of missing parts in the feature lines associated with the lane marking data.

In one aspect, a system for generating the feature line is disclosed. The system comprises a memory configured to store computer-executable instructions; and at least one processor configured to execute the computer-executable instructions to determine connectivity data for the feature line based on at least one first point associated with the feature line and at least one second line, wherein the at least one second line is within a maximum distance from the at least one first point. The at least one processor is further configured to generate orientation data associated with the at least one first point and at least one second point associated with the at least one second line, in response to determining the connectivity data for the feature. The at least one processor is further configured to generate a connecting line for the feature line based on the at least one first point, the at least one second point, and the generated orientation data. The feature line and the second line may be associated with lane marking data of the map database. Further, the map database may be updated based on the generated connecting line of the feature line. Also, the at least one first point and the at least one second point may be border points corresponding to the feature line and the at least one second line respectively, and the at least one second point may be within the maximum distance of the at least one first point.

In additional system embodiments, to determine the connectivity data for the feature line, the at least one processor is further configured to: calculate first distance data for a distance between the at least one first point and each of one or more nearby points, wherein each of the one or more nearby points are border points of one or more nearby lines, such that the one or more nearby lines are within the maximum distance of the feature line, and the at least one second point is one of the one or more nearby points and the at least one second line is one of the one or more nearby lines. Further, the at least one processor is configured to compare the calculated first distance data for each of the one or more nearby points with the maximum distance and determine the connectivity data for the feature line based on the comparison. The connectivity data may indicate at least one of: the feature line is a disconnected line when the calculated first distance is not within the maximum distance for at least one of the one or more nearby points, and the feature line is a continuous line when the calculated first distance is within the maximum distance for each of the one or more nearby points.

In additional system embodiments, to generate the orientation data, the at least one processor is further configured to: generate a first orientation data for each of the one or more nearby points based on the at least one first point and the corresponding each of the one or more nearby points, wherein the first orientation data is associated with a direction pointing outward from the at least one first point towards the corresponding nearby point; and generate the orientation data associated with the at least one first point and the at least one second point based on the first orientation data.

In additional system embodiments, the at least one processor is further configured to compare the first orientation data for each of the one or more nearby points with an orientation data threshold (h) and compare the first distance data for distance between the at least one first point and each of one or more nearby points with a distance data threshold (d). Further, based on both the comparisons, one or more candidate points may be obtained such that: the first orientation data for each of the one or more candidate points is within the orientation data threshold (h), and the first distance data for each of the one or more candidate points is within the distance data threshold (d).

In additional system embodiments, the at least one processor is further configured to determine lane width data associated with the feature line; and identify the one or more candidate points based on the lane width data, the orientation data threshold (h), and the data distance threshold (d).

In additional system embodiments, the at least one processor is further configured to determine distance data associated with distance between at least one first point and the at least one second point and generate a connecting line for the feature line based on the at least one first point, the at least one second point, the distance data, and the generated orientation data.

In additional system embodiments, the at least one processor is further configured to identify the at least one second point from the one or more candidate points such that: the orientation data of the at least one second point is minimum orientation data among the first orientation data of each of the one or more candidate points, and the distance data of the at least one second point is minimum distance data among the first distance data of each of the one or more candidate points.

In additional system embodiments, the at least one processor is further configured to generate the connecting line of the feature line by connecting the at least one first point with the at least one second point via a line segment.

In another aspect, a method for generating a feature line is provided. The method comprises determining at least one first point associated with the feature line, wherein the at least one first point is a border point of the feature line. The method further comprises determining one or more candidate points associated with one or more nearby lines of the feature line, based on first distance data and first orientation data, wherein each of the one or more candidate points is a border point of the corresponding nearby line. Further, the method comprises identifying at least one second point from the one or more candidate points based on a distance data threshold (d) and an orientation data threshold (h) and generating a connecting line for the feature line based on the at least one first point and the at least one second point. The connecting line is generated by connecting the at least one first point and the at least one second point via a line segment. The generated connecting line and thus the generated feature line is used to update the map database.

In additional method embodiments, determining the one or more candidate points the comprises calculating the first distance data for a distance between the at least one first point and each of one or more nearby points. Each of the one or more nearby points are border points of the one or more nearby lines that are within a maximum distance from the at least one first point. Further, the method comprises generating the first orientation data for each of the one or more nearby points based on the at least one first point and the corresponding each of the one or more nearby points. The first orientation data is associated with a direction pointing outward from the at least one first point towards the corresponding nearby point. Further, the calculated first distance data for each of the one or more nearby points is compared with the distance data threshold (d) and the generated first orientation data for each of the one or more nearby points is compared with the orientation data threshold (h). The comparisons are user for determining the one or more candidate points from the one or more nearby points such that: the first orientation data for each of the one or more candidate points is within the orientation data threshold (h), and the first distance data for each of the one or more candidate points is within the distance data threshold (d).

In additional method embodiments, the method further comprises identifying the at least one second point from the one or more candidate points such that: the orientation data associated with the at least one second point is minimum orientation data among the first orientation data of each of the one or more candidate points, and the distance data associated with the at least one second point is minimum distance data among the first distance data of each of the one or more candidate points.

In additional method embodiments, the method further comprises comparing the calculated first distance data for each of the one or more nearby points with the maximum distance; and determining connectivity data for the feature line based on the comparison, wherein the connectivity data indicates at least one of whether the feature line is a disconnected line or a continuous line. The feature line is a disconnected line when the calculated first distance is not within the maximum distance for at least one of the one or more nearby points, and the feature line is a continuous line when the calculated first distance within the maximum distance for each of the one or more nearby points.

In yet another aspect, a computer program product comprising a non-transitory computer readable medium having stored thereon computer executable instructions which when executed by at least one processor, cause the processor to carry out operations for generating a feature line, the operations comprising: generating orientation data associated with at least one first point associated with the feature line and at least one second point associated with at least one second line, and wherein the at least one first point and the at least one second point are border points of the feature line and the at least one second line respectively. Further, the operations comprise determining distance data associated with distance between the at least one first point and the at least one second point. Additionally, the operations comprise generating a connecting line for the feature line based on the at least one first point and the at least one second point when the orientation data is within an orientation data threshold (h) and the distance data is within a distance data threshold (d).

In additional computer program product embodiments, the operations further comprise calculating first distance data for a distance between the at least one first point and each of one or more nearby points, wherein each of the one or more nearby points are border points of one or more nearby lines which are within the maximum distance from the at least one first point. The operations further comprise generating first orientation data for each of the one or more nearby points based on the at least one first point and the corresponding each of the one or more nearby points, wherein the first orientation data is associated with a direction pointing outward from the at least one first point towards the corresponding nearby point. The operations further comprise comparing the calculated first distance data for each of the one or more nearby points with the distance data threshold (d) and comparing the generated first orientation data for each of the one or more nearby points with the orientation data threshold (h). Additionally, the operations comprise determining one or more candidate points from the one or more nearby points such that: the first orientation data for each of the one or more candidate points is within the orientation data threshold (h), and the first distance data for each of the one or more candidate points is within the distance data threshold (d).

In additional computer program product embodiments, the operations further comprise identifying the at least one second point from the one or more candidate points such that: the orientation data associated with the at least one second point is minimum orientation data among the first orientation data of each of the one or more candidate points, and the distance data associated with the at least one second point is minimum distance data among the first distance data of each of the one or more candidate points.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
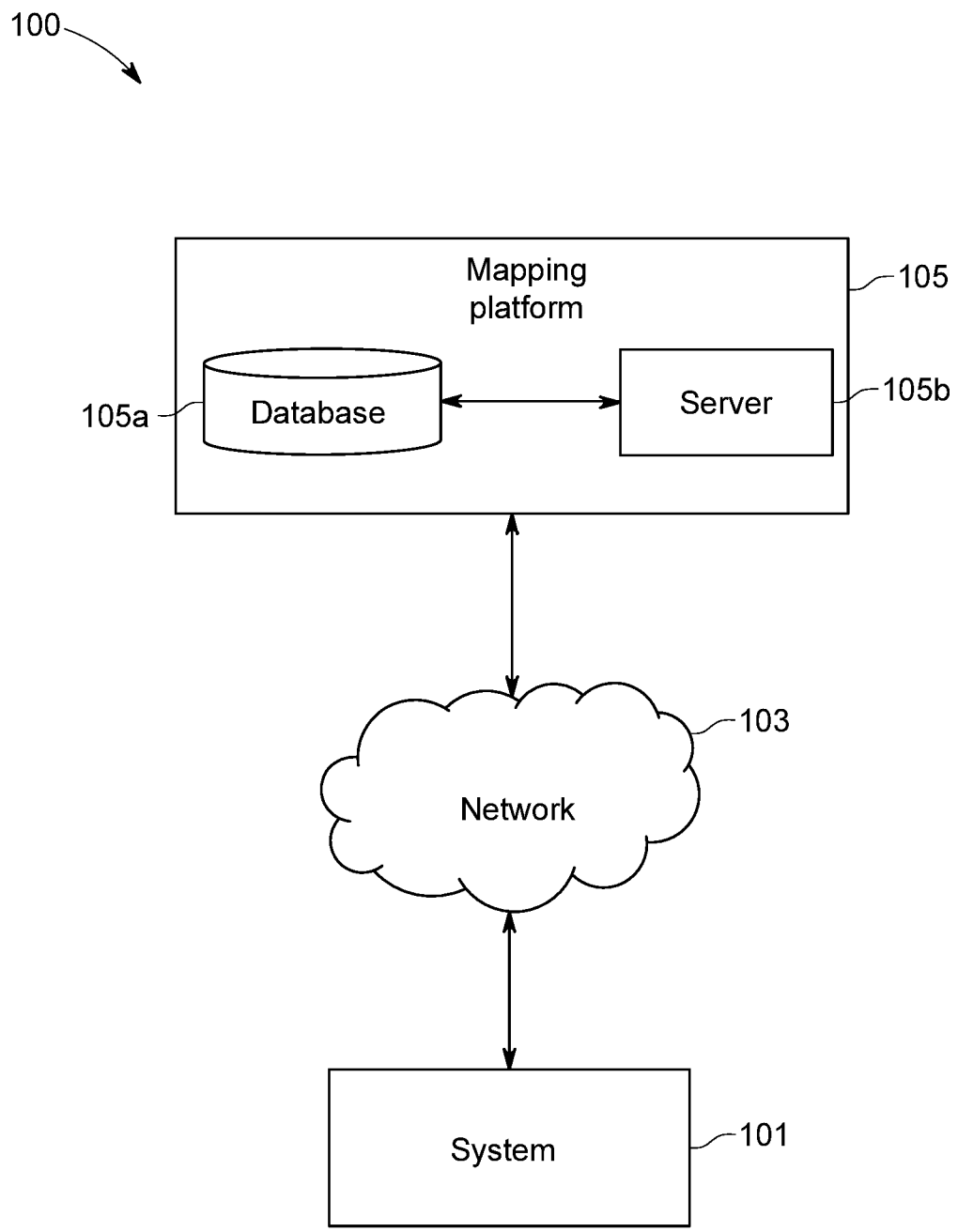

Having thus described example embodiments of the invention in general terms, reference will now be made to the accompanying drawings, which are not necessarily drawn to scale, and wherein:

FIG. 1 illustrates a block diagram showing an example architecture of a system for generating a feature line, in accordance with one or more example embodiments.

Figure 2A:
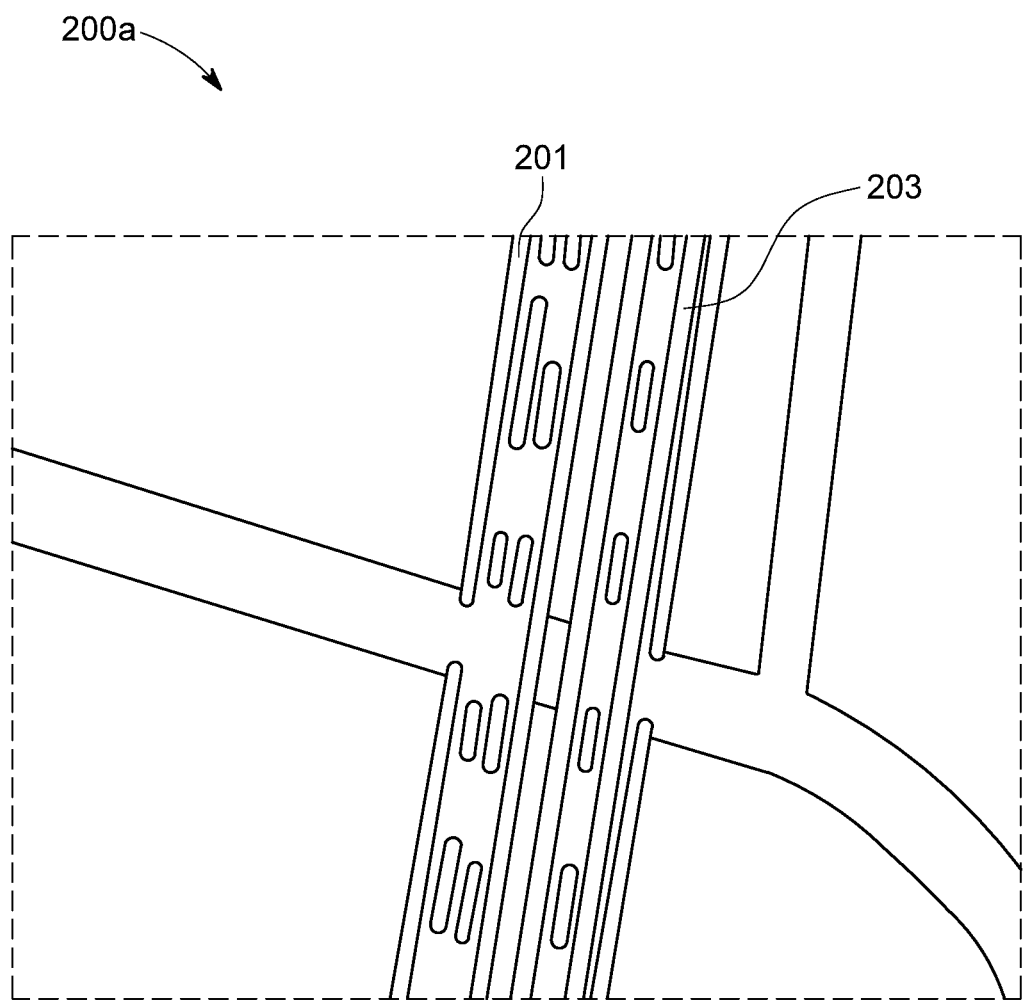

FIG. 2A illustrates an exemplary user interface showing different feature lines on a map for lane markings, in accordance with one or more example embodiments.

Figure 2B:
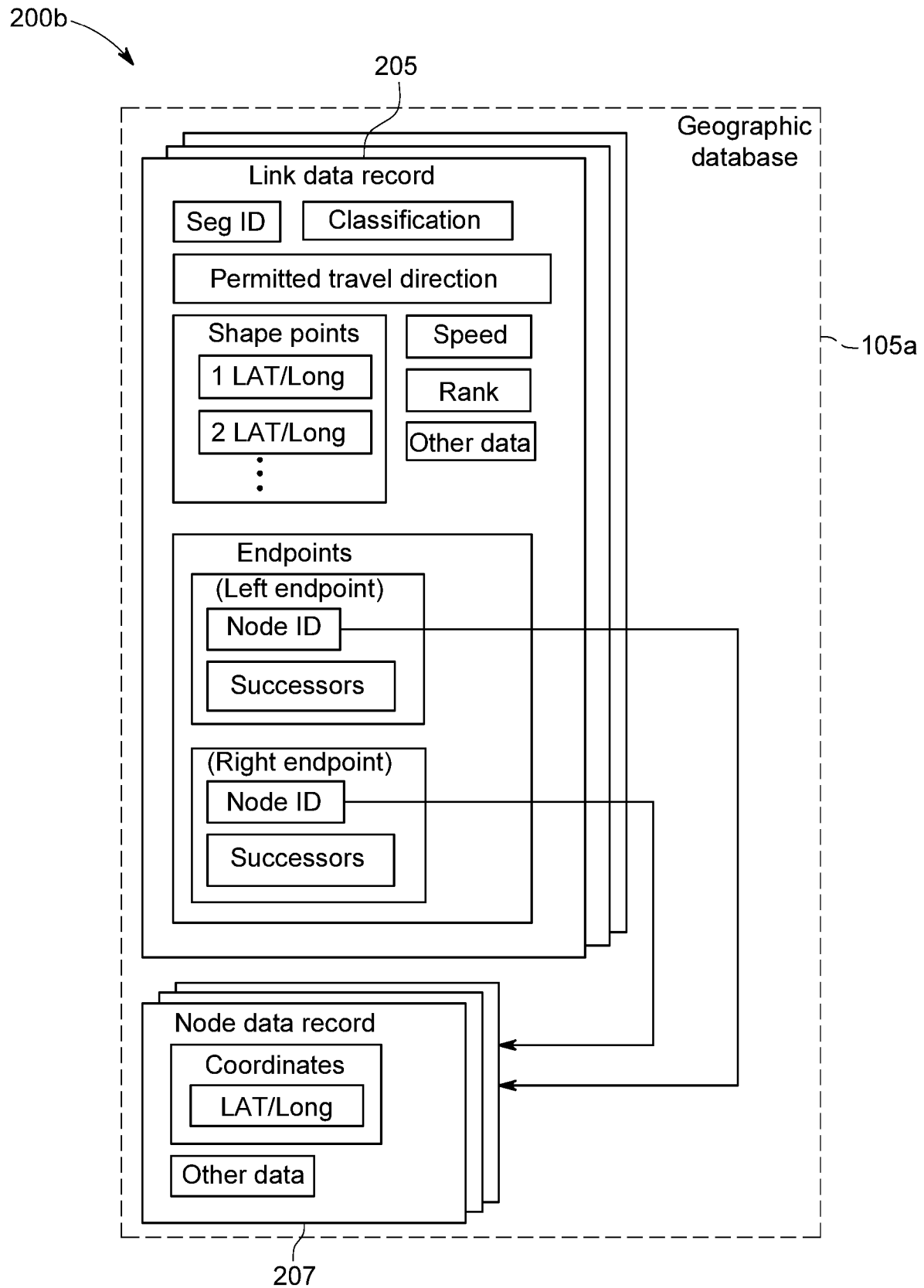

FIG. 2B illustrates an exemplary map data record storing data for feature lines shown in FIG. 2A, in accordance with one or more example embodiments.

Figure 2C:
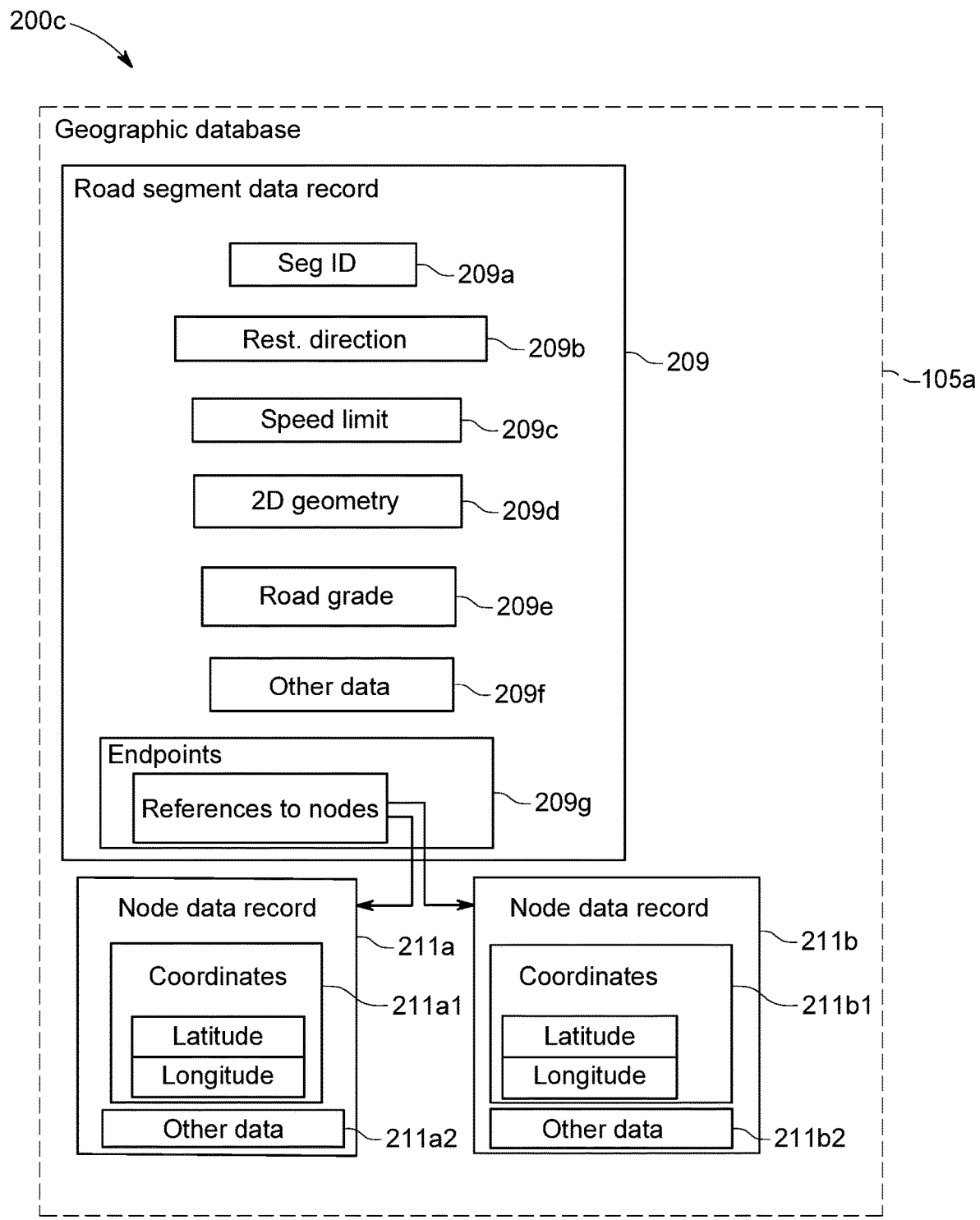

FIG. 2C illustrates another exemplary map database record storing data for feature lines shown in FIG. 2A, in accordance with one or more example embodiments.

Figure 2D:
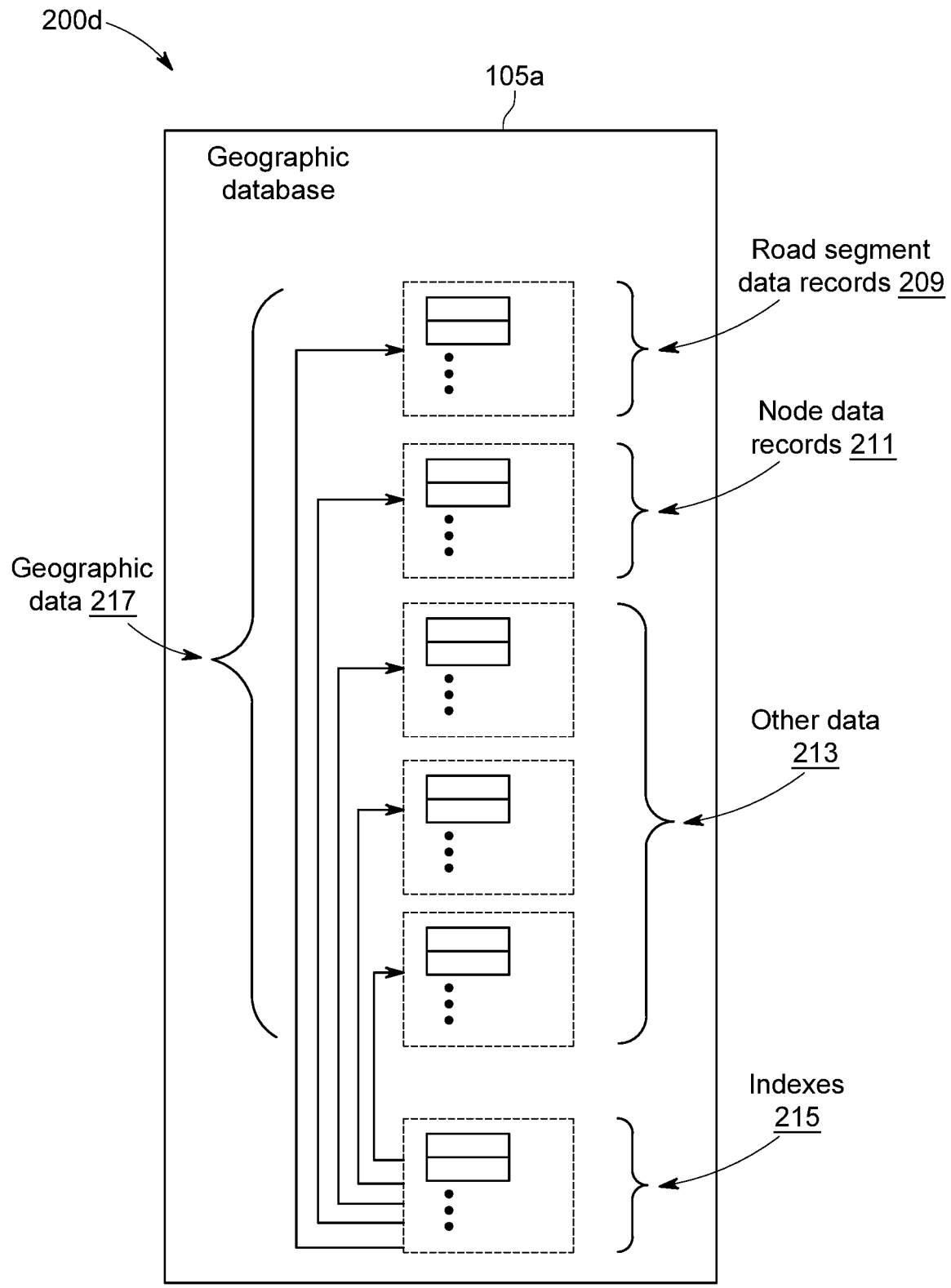

FIG. 2D illustrates an exemplary map database storing data for feature lines shown in FIGS. 2B and 2C, in accordance with one or more example embodiments.

Figure 3:
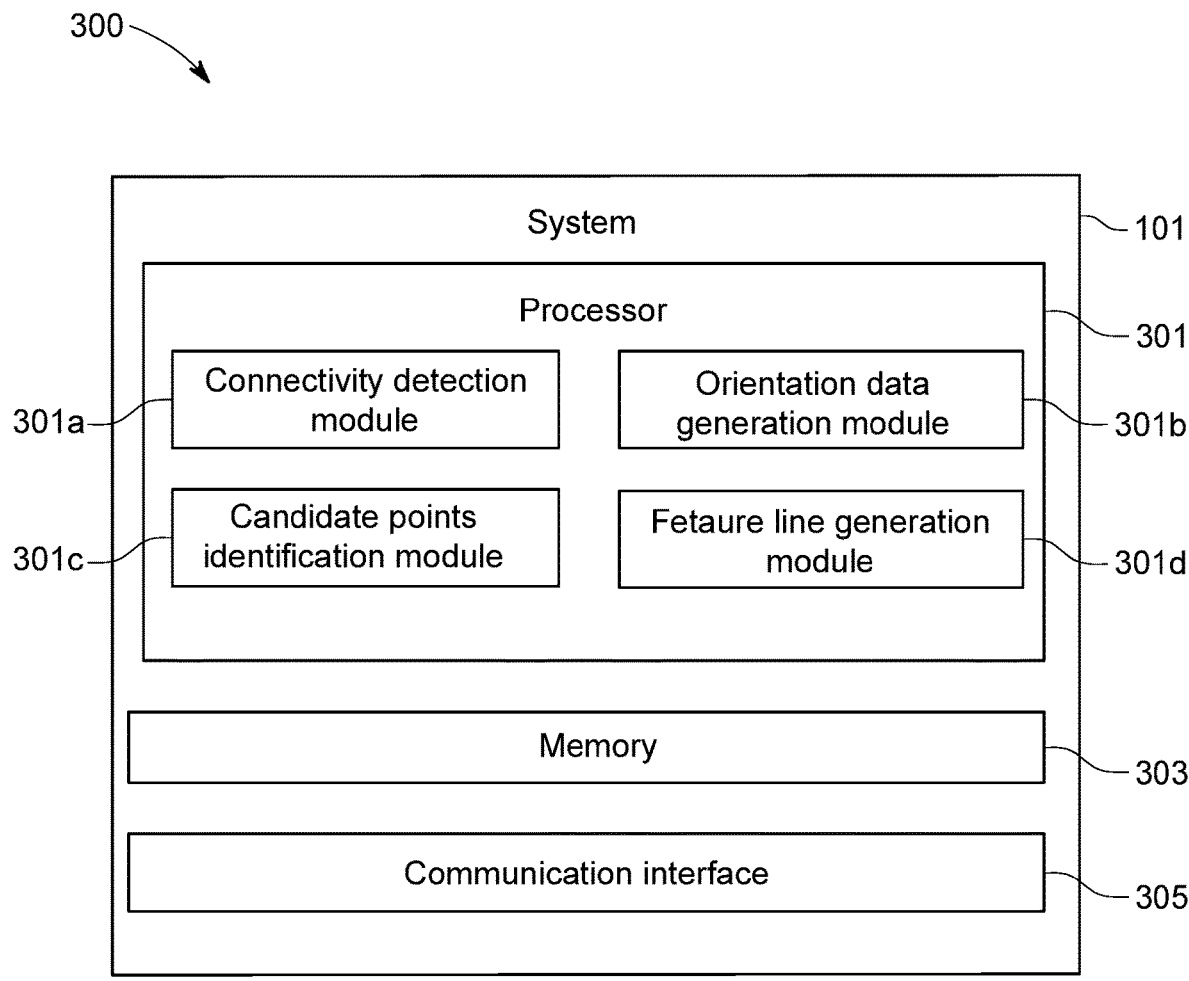

FIG. 3 illustrates an exemplary block diagram of a system for generating feature line data, in accordance with one or more example embodiments.

Figure 4:
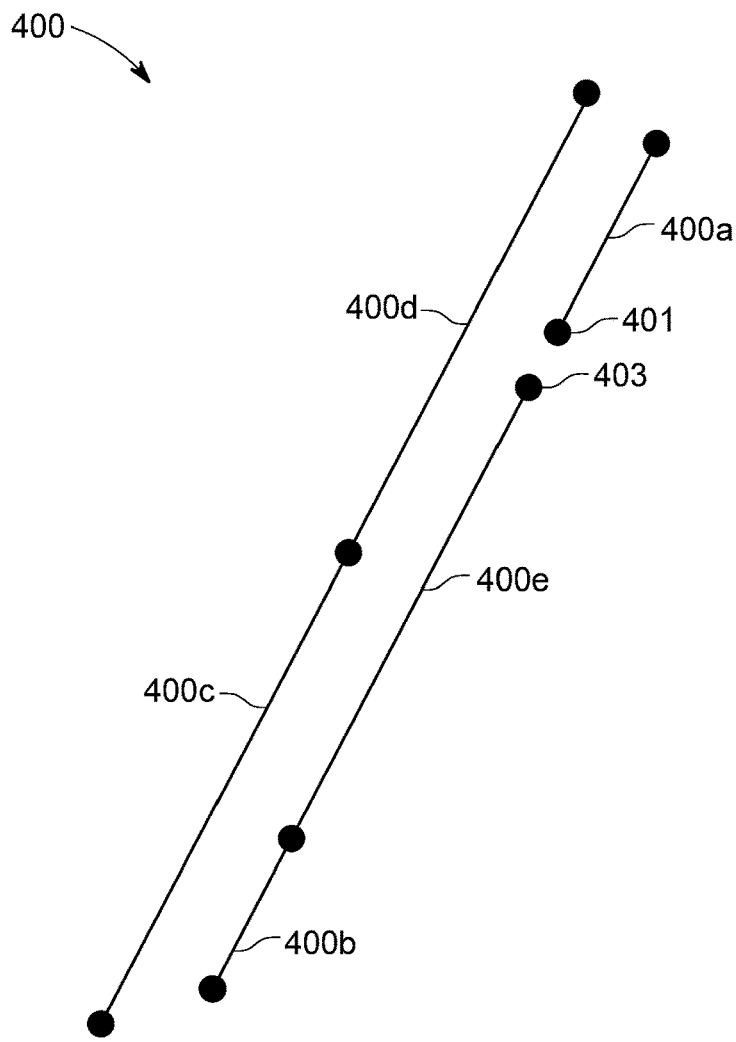

FIG. 4 illustrates a schematic diagram of an exemplary feature line having disconnected portions, in accordance with one or more example embodiments.

Figure 5:
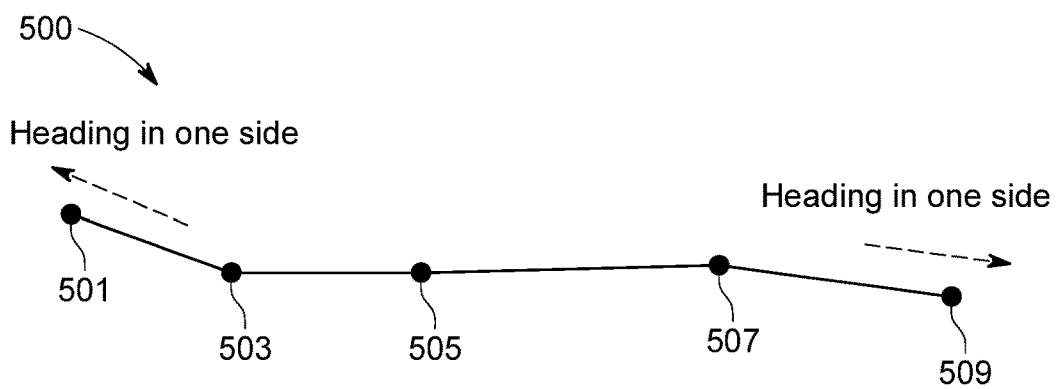

FIG. 5 illustrates a schematic diagram of a feature line showing various points on the feature line, in accordance with one or more example embodiments.

Figure 6A:
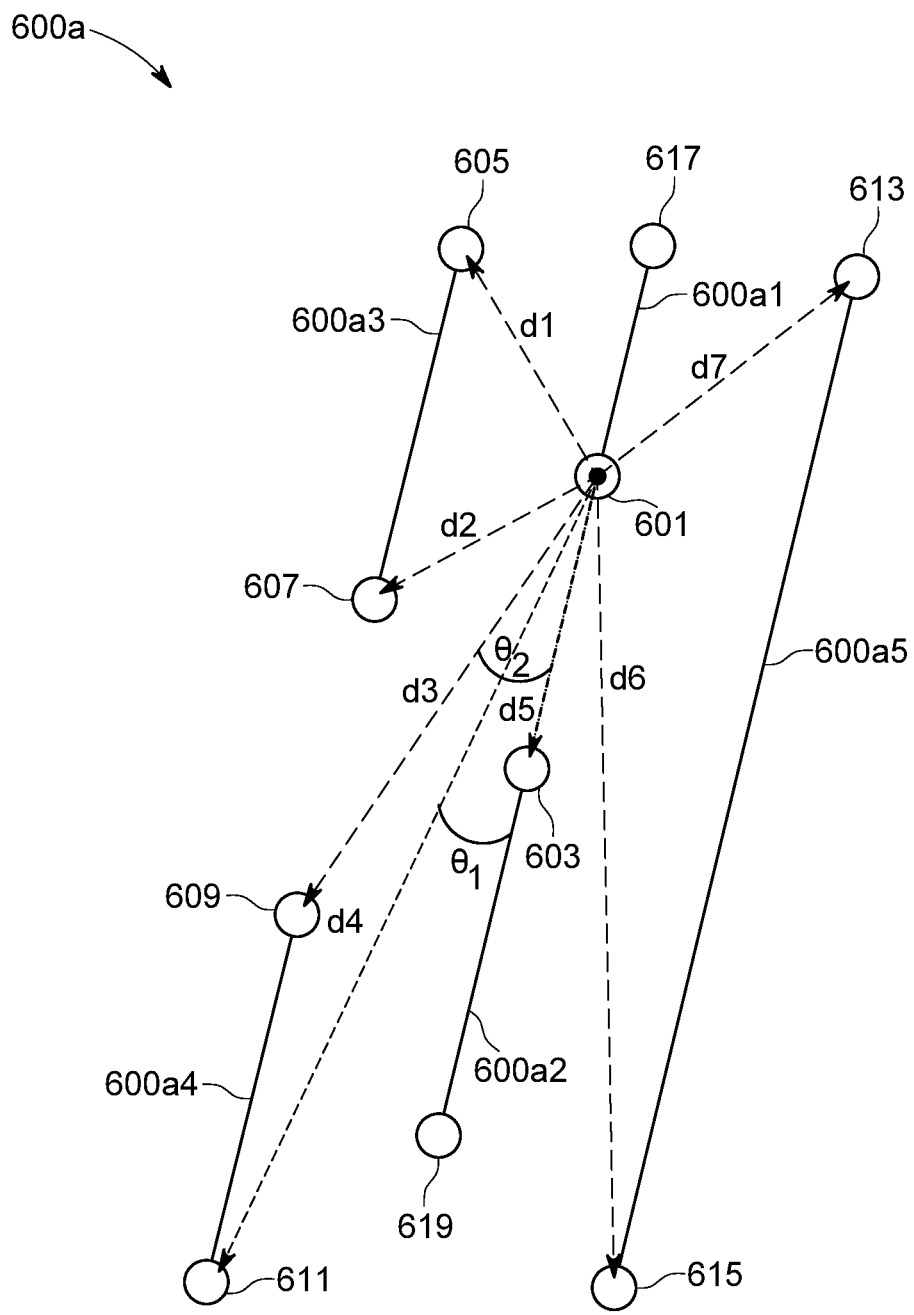

FIG. 6A illustrates an exemplary scenario for generating feature line data, in accordance with one or more example embodiments.

Figure 6B:
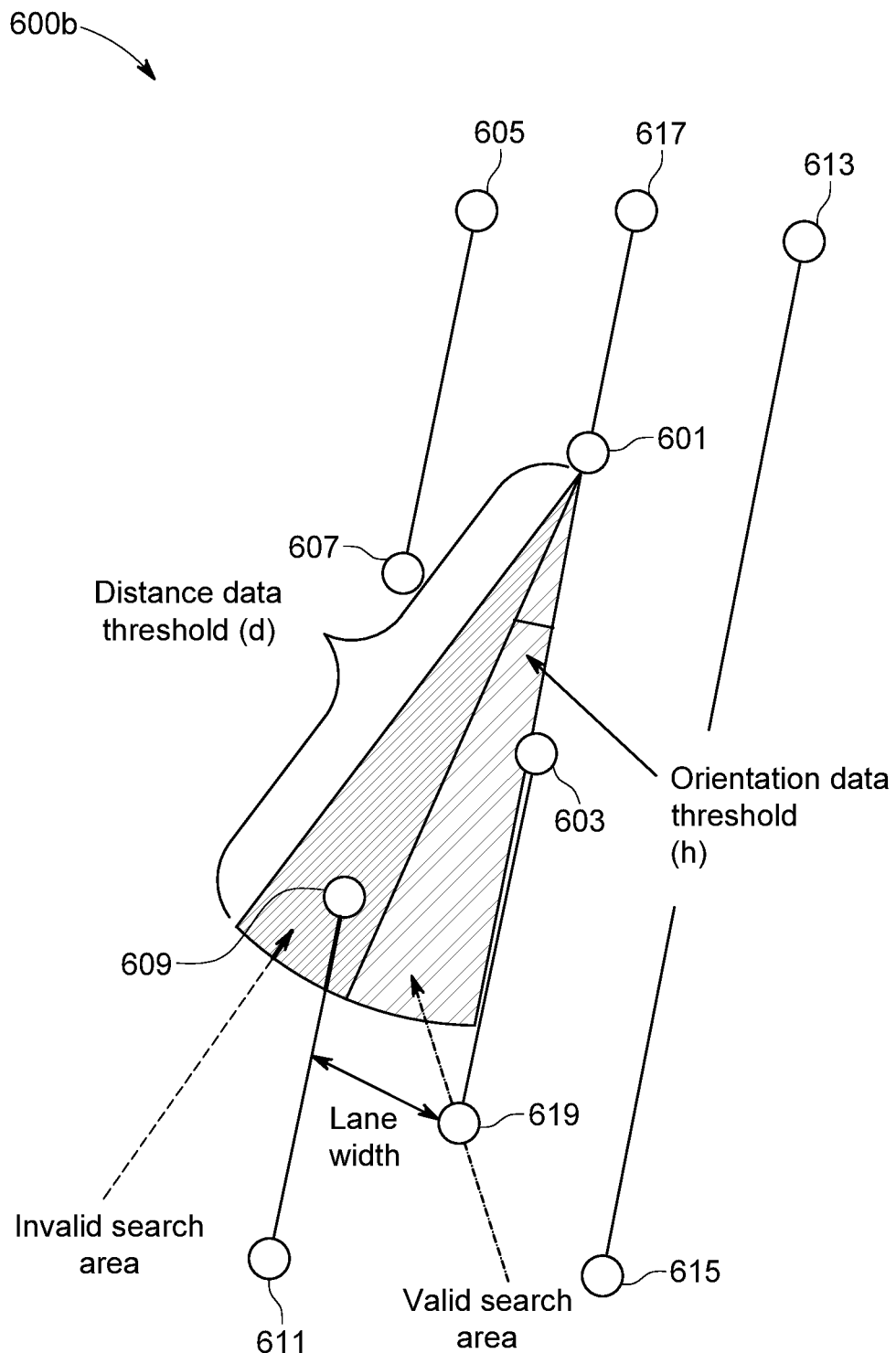

FIG. 6B illustrates an exemplary scenario for candidate point identification for generating feature line data based on a distance data threshold and an orientation data threshold, in accordance with one or more example embodiments.

Figure 7:
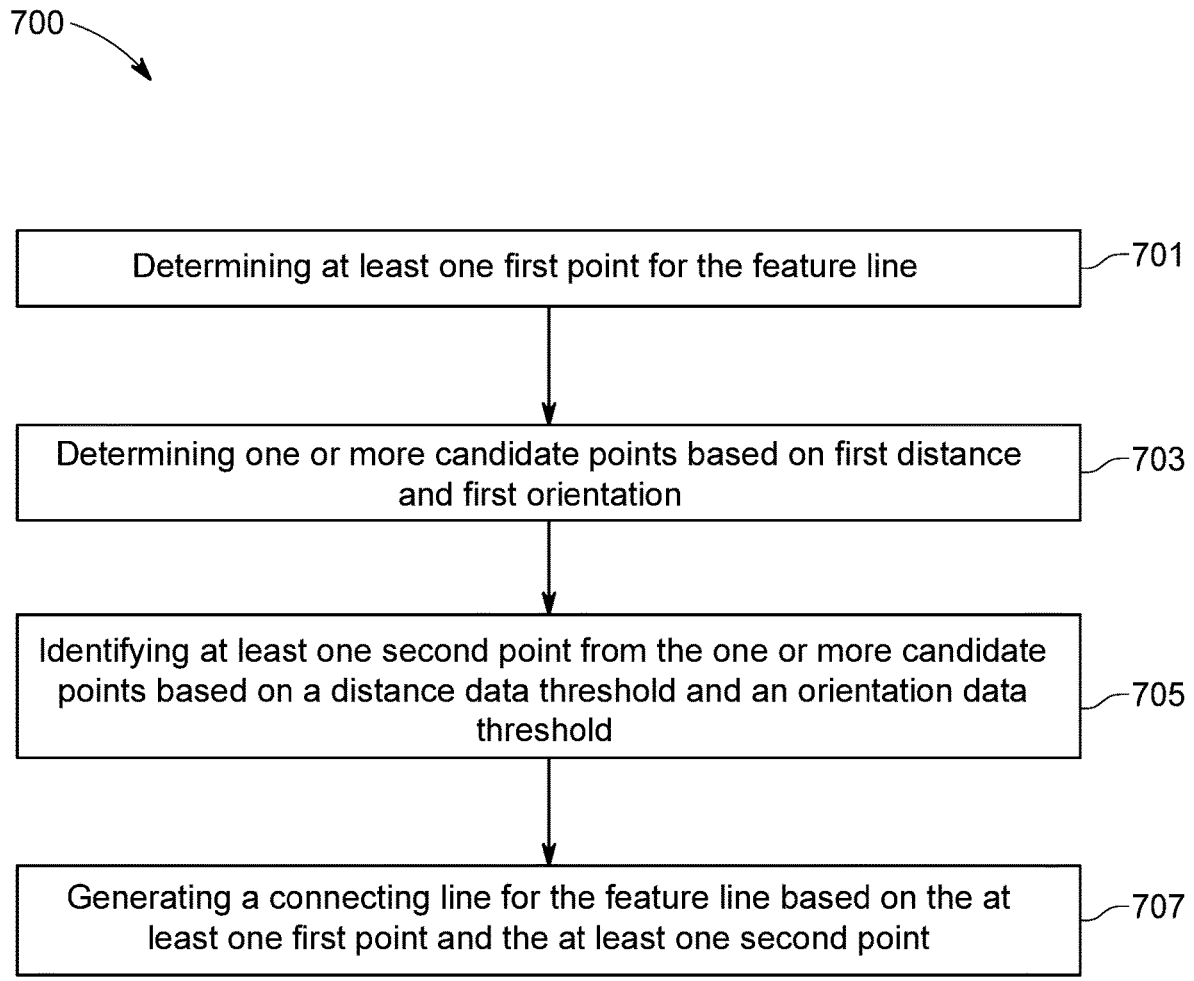

FIG. 7 is a flowchart of a method for generating a feature line, in accordance with one or more example embodiments.

Figure 8:
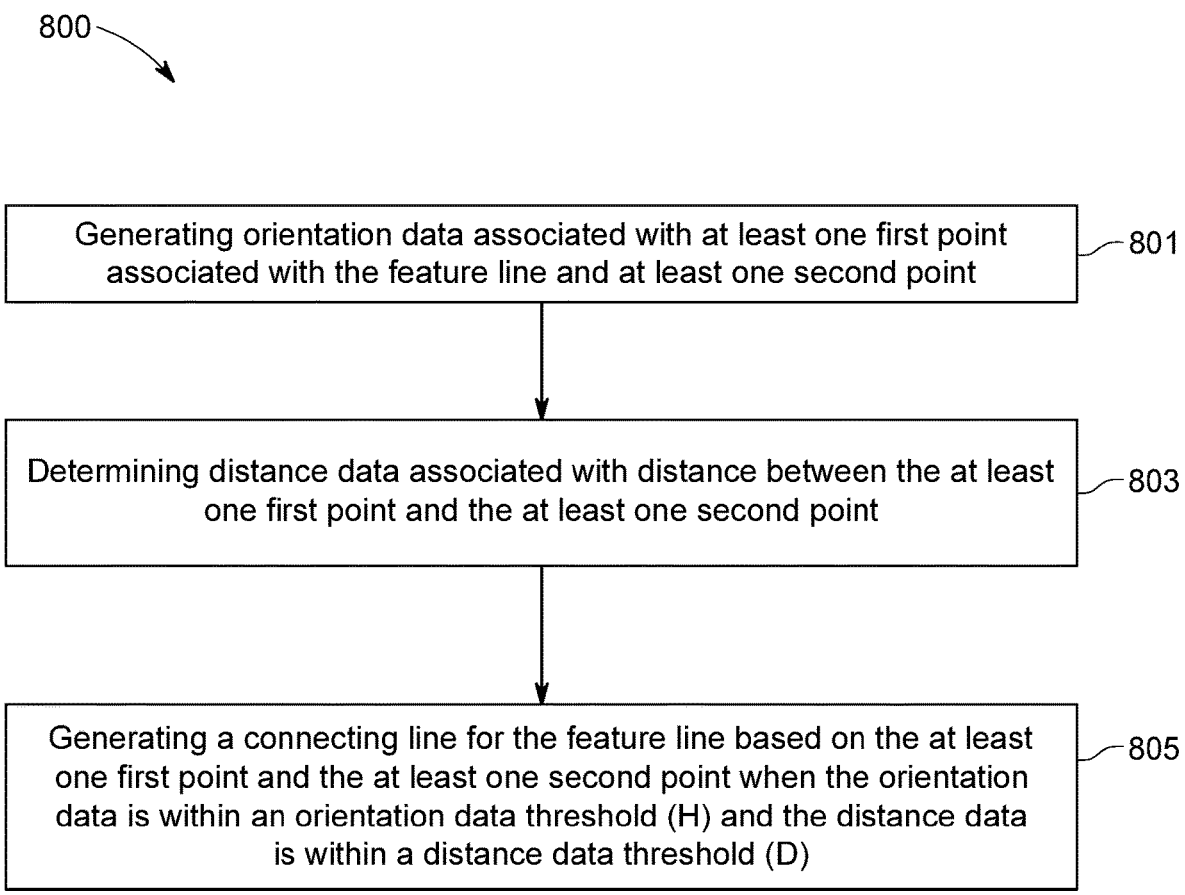

FIG. 8 is a flowchart of another method for generating a feature line, in accordance with one or more example embodiments.

Figure 9A:
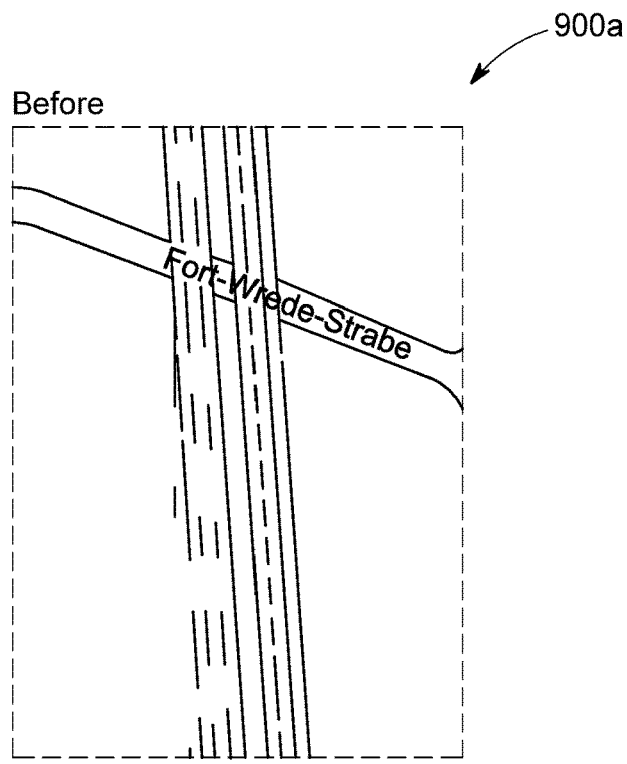

FIG. 9A illustrates an exemplary user interface showing lane marking data before using the systems and methods disclosed in accordance with one or more example embodiments.

Figure 9B:
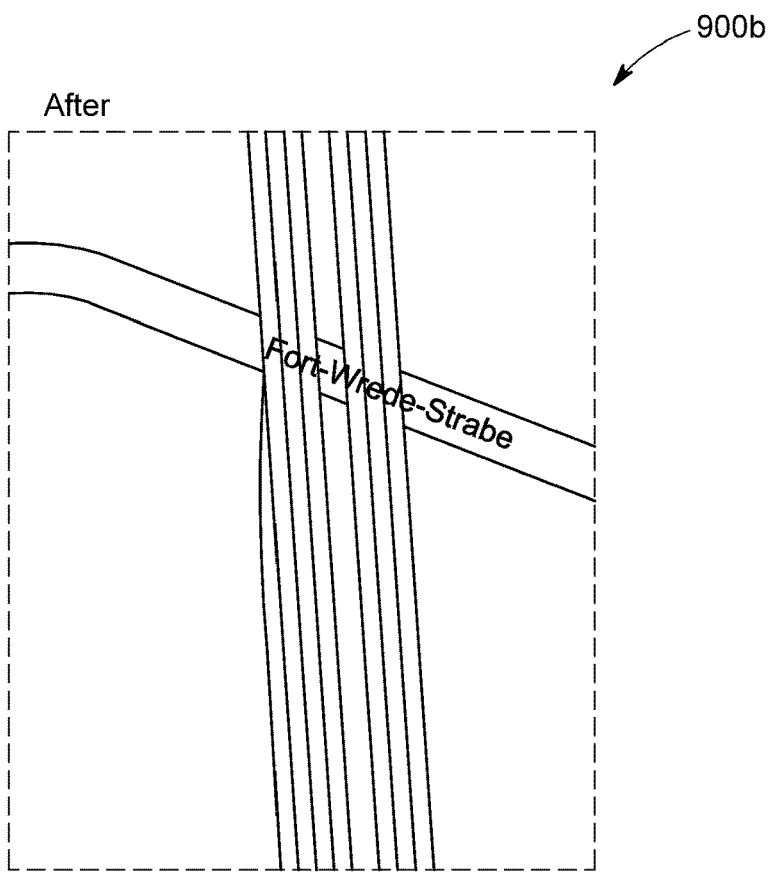

FIG. 9B illustrates an exemplary user interface showing lane marking data after using the systems and methods disclosed in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A system, a method, and a computer program product are provided for generating a feature line. The feature line may be associated with boundary lines, also interchangeably referred to as lane markings or lane marking data, stored in a map database. The feature line may be identified based on multiple sources such as sensors, satellite imagery and ground truth data, and may be dashed, discontinuous, incomplete and have missing parts. These missing parts need to be complemented to provide enhanced and safe navigation in autonomous, semi-autonomous and manually-driven vehicles.

Various embodiments are provided herein for generating the feature line by complementing the missing parts, such as by generating a connecting line for the feature line, such that the connecting line completes the incomplete feature line.

In various embodiments, to form the connecting line, at least two points are identified to form a line segment between these two points. These two points are border points of disconnected parts of the feature line. These two points comprise at least one first point and at least one second point. The at least one first point is the point under consideration for completing the feature line and is considered to be associated with the feature line. The second point is associated with at least one second line. The at least one second line may be one of the disconnected parts of the feature line itself and is within a maximum distance from the at least one first point.

Various embodiments provide methods and systems for checking whether the at least one first point and the at least one second point satisfy a distance and orientation separation criteria, and if yes, joining the at least one first point and the at least one second point by forming a line segment to connect them, and thus, generate the complete feature line.

FIG. 1 illustrates a block diagram 100 showing an example architecture of a system 101 for generating a feature line, in accordance with one or more example embodiments. As illustrated in FIG. 1, the block diagram 100 may comprise the system 101, a network 103, and a mapping platform 105. The mapping platform 105 may further comprise a map database 105a (also referred to as a geographic database 105a) and a server 105b. The components described in the block diagram 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In various embodiments, the system 101 may be onboard a vehicle, such as the system 101 may be a navigation system installed in the vehicle for detecting lane marking data and using this data for performing one or more navigation functions. In various embodiments, the vehicle may be an autonomous vehicle, a semiautonomous vehicle, or a manually operated vehicle. In some embodiments, the system 101 may be the server 105b of the mapping platform 105 and therefore may be co-located with or within the mapping platform 105. For example, the system 101 may be embodied as a cloud based service, a cloud based application, a cloud based platform, a remote server based service, a remote server based application, a remote server based platform, or a virtual computing system. In some other embodiments, the system 101 may be an OEM (Original Equipment Manufacturer) cloud. The OEM cloud may be configured to anonymize any data received from the system 101, such as the vehicle, before using the data for further processing, such as before sending the data to the mapping platform 105. In some embodiments, anonymization of data may be done by the mapping platform 105.

In some embodiments, the system 101 may comprise one or more user equipment for example as a part of an in-vehicle navigation system, a navigation app in a mobile device and the like. In each of such embodiments, the system 101 may be communicatively coupled to the components shown in FIG. 1 to carry out the desired operations and wherever required modifications may be possible within the scope of the present disclosure.

In some example embodiments, the user equipment may be any user accessible device such as a mobile phone, a smartphone, a portable computer, and the like that are portable in themselves or as a part of another portable/mobile object such as the vehicle. The user equipment may comprise a processor, a memory, and a communication interface. The processor, the memory, and the communication interface may be communicatively coupled to each other. In some example embodiments, the user equipment is associated, coupled, or otherwise integrated with the vehicle, such as an advanced driver assistance system (ADAS), a personal navigation device (PND), a portable navigation device, an infotainment system and/or other device that may be configured to provide route guidance and navigation related functions to the user. In such example embodiments, the user equipment comprises processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment. For example, the user equipment may be configured to execute and run mobile applications such as a messaging application, a browser application, a navigation application, and the like.

In one embodiment, the user equipment may be directly coupled to the system 101 via the network 103. In another embodiment, the user equipment may be coupled to the system 101 via the OEM cloud and the network 103. For example, the user equipment may be a consumer vehicle (or a part thereof) and may be a beneficiary of the services provided by the system 101. In some example embodiments, the user equipment may serve the dual purpose of a data gatherer and a beneficiary device. For example, the user equipment may be installed in the vehicle and is configured to detect feature lines on links and/or road segments by using image based sensors installed in the vehicle. The user equipment then sends this detection data to the system 101, which uses unsupervised learning techniques to complete any missing parts in the feature line and generate the feature line for completion.

Further, the system 101 may be communicatively coupled with the mapping platform 105 over the network 103. The network 103 may be wired, wireless, or any combination of wired and wireless communication networks, such as cellular, Wi-Fi, internet, local area networks, or the like. In some embodiments, the network 103 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The system 101 may communicate with the mapping platform 105, via the network 103, where the mapping platform 105 may comprise the map database 105*a* for storing map data, and the processing server 105*b* for carrying out the processing functions associated with the mapping platform 105. The map database 105*a* may store node data, road segment data or link data, point of interest (POI) data, road obstacles related data, traffic objects related data, posted signs related data, such as road sign data, sensor data related to permissible driving directions, data about valid paths based on legally permissible road geometries or the like. The map database 105*a* may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. For example, the node data may represent data for intersections. The road/link data and the node data may represent a road network, such as used by vehicles, for example, cars, trucks, buses, motorcycles, and/or other entities.

Optionally, the map database 105*a* may contain path segment and node data records or other data that may represent pedestrian paths or areas in addition to or instead of the vehicle road record data, for example. The road/link segments and nodes may be associated with attributes, such as geographic coordinates, lane data records and other navigation related attributes, as well as POIs, such as fueling stations, hotels, restaurants, museums, stadiums, offices, auto repair shops, buildings, stores, parks, etc. The lane data records may comprises data related a number of lanes on a particular link/road segment, a number of lanes for a particular link/road segment determined by visual inspection, data about feature lines forming lane markings and the like. Additionally, the lane data records may comprise legal travel directions (travel directions that the vehicles should follow while traveling on lanes of a particular link/road segment), lane level speed profile (historically derived speed limits for a lane), lane level maneuver pattern (lane change patterns at intersections), and the like.

The map database 105a may include data about the POIs and their respective locations in the POI records. The map database 105a may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 105a may include event data (e.g., traffic incidents, construction activities, scheduled events, unscheduled events, etc.) associated with the POI data records or other records of the map database 105a. The map database 105a may additionally include data related to road signs, road obstacles, traffic objects and the like. The map database may be communicatively coupled to the processing server 105b.

In one embodiment, the map or geographic database 105a may be maintained by a content provider in association with the mapping platform 105 (e.g., a map developer). The map developer may collect geographic data to generate and enhance the geographic database 105a. There may be different ways used by the map developer to collect data. These ways may include obtaining data from other sources, such as municipalities or respective geographic authorities. In addition, the map developer may employ field personnel to travel by vehicle (e.g., vehicles and/or user terminals) along roads throughout the geographic region to observe features and/or record information about them, for example. Such data may form part of ground truth data records stored in the mapping platform 105. In an alternate embodiment, the ground truth data of the ground truth data records may be collected by a ground truth recorder device installed in the ground truth vehicle. As used herein, the 'ground truth vehicle' may correspond to a vehicle manually driven by human for collecting the ground truth data. As used herein, the ground truth recorder device may be a device (comprising memory and processor) to record a ground truth vehicle location (also referred to as ground truth location data) and data about a road object, when the road object is observed, and the road object is applicable on a link in which the ground truth vehicle is currently travelling.

In some embodiments, the map data may be collected by end-user vehicles which use vehicles' on-board sensors to detect data about various entities such as road objects, lane markings, links, and the like. These end-user vehicles are also referred to as probe vehicles and form an alternate form of data source for map data collection, along with ground truth data. Additionally, data collection mechanisms like remote sensing, such as aerial or satellite photography, may be used to collect the data for the map database 105a.

The map database 105a may be a master geographic database stored in a format that facilitates updating, maintenance, and development. According to some embodiments, the map data in the map database 105a may be stored as a digital map. The digital map may correspond to a high-definition map or a fast map, which is formed on the basis of satellite raster imagery, bitmap imagery, or the like. The satellite rater imagery/bitmap imagery may include map features (such as road/link segments, nodes, feature lines for lane markings and the like) and attributes associated with the map features. In some embodiments, the map features may have a vector representation form. Additionally, the satellite raster imagery may include three dimensional (3D) map data that corresponds to 3D map features, which are defined as vectors, voxels, or the like. In these embodiments, the digital map may be divided into map tiles. Each map tile of the digital map may define a geographic region. The geographic region may include one or more link segments, one or more nodes associated with the one or more link segments, and the attributes associated with the one or more link segments. For example, the geographic region may include a ramp road geometry having a main link segment, a ramp link segment, a ramp start location, and attributes associated with the main link segment and the ramp link segment. The main link segment may correspond to freeway, motorway, expressway, highway, and the like. The ramp link segment may correspond to at least one of an exit-ramp or entrance ramp link associated with the main link segment.

In some embodiments, the map database 105a is a master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data is compiled (such as into a platform specification format (PSF) format) to organize and/or configure the data for performing navigation-related functions and/or services, such as maneuvering of an autonomous vehicle, route calculation, route guidance, map display, speed calculation, distance and travel time functions, and other functions, by a navigation device, such as by a vehicle or a user terminal, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The processing server 105b may comprise one or more processors configured to process requests received from the system 101. The processor may fetch map data from the map database 105a and transmit the same to the system 101 in a format suitable for use by the system 101. In some example embodiments, as disclosed in conjunction with the various embodiments disclosed herein, the system 101 may be used to generate one or more feature lines associated with lane markings of the map data stored in the map database 105a.

FIG. 2A illustrates an exemplary user interface 200a showing different types feature lines on a mapping interface. The user interface 200a may be associated with one or more user equipment installed in the vehicle discussed in conjunction with FIG. 1. The user interface 200a may be configured to display images about various navigation entities in the form of high definition maps, where clarity and resolution of images is high (such as of the order of 320 dpi), and the information displayed about the navigation entities on the maps is collected using data sources beyond the on-board vehicle sensors only, to provide most accurate, up-to-date and real time map data. The accuracy of data is important, especially for maneuvering and control of autonomous vehicles. However, as depicted in the user interface 200a, sometimes this map data may be incomplete.

For example, on the user interface 200a, two types of feature lines are depicted. Feature line 201 is having discontinuities as some parts are missing in the feature line 201, making it appear dashed, rather than in the form of a continuous line on the user interface 200a. On the other hand, feature line 203 is a complete feature line, without any discontinuities. The purpose of the methods and systems (such as the system 101) disclosed herein, is to complete the missing parts of incomplete feature lines, like the feature line 201, and generate a new feature line that is complete and thus can be used for accurate navigation.

As already discussed, the feature lines, such as the feature line 201 and the feature line 203, may be associated with lane marking data stored in the map database 105a. Thus, when the incomplete feature line 201 is generated by forming a connecting line between discontinuous parts to give a complete feature line, the system 101 is also configured to the map database 105a based on the generated connecting line of the feature line 201. This ensures that the map data stored in the map database 105a is highly accurate and up-to-date. In some embodiments, the feature lines are associated with corresponding links, and data about the feature lines is stored in the form of link data records in the map database 105a.

FIG. 2B shows format of the map data 200b stored in the map database 105a according to one or more example embodiments. FIG. 2B shows a link data record 205 that may be used to store data about one or more of the feature lines, that is the feature line 201 and the feature line 203, illustrated in FIG. 2A. This link data record 205 has information (such as "attributes", "fields", etc.) associated with it that allows identification of the nodes associated with the link and/or the geographic positions (e.g., the latitude and longitude coordinates and/or altitude or elevation) of the two nodes. In addition, the link data record 205 may have information (e.g., more "attributes", "fields", etc.) associated with it that specify the permitted speed of travel on the portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record that represents another-than-straight road segment may include shape point data. A shape point is a location along a link between its endpoints. To represent the shape of other-than-straight roads, the mapping platform 105 and its associated map database developer selects one or more shape points along the other-than-straight road portion. Shape point data included in the link data record 205 indicate the position, (e.g., latitude, longitude, and optionally, altitude or elevation) of the selected shape points along the represented link.

Additionally, in the compiled geographic database, such as a copy of the map database 105a that is compiled and provided to the user interface 200a, there may also be a node data record 207 for each node. The node data record 207 may have associated with it information (such as "attributes", "fields", etc.) that allows identification of the link(s) that connect to it and/or its geographic position (e.g., its latitude, longitude, and optionally altitude or elevation).

In some embodiments, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function, but excludes data and attributes that are not needed for performing the function. Thus, the map data may be alternately stored in a format suitable for performing types of navigation functions, and further may be provided on-demand, depending on the type of navigation function.

FIG. 2C shows another format of the map data 200c stored in the map database 105a according to one or more example embodiments. In the FIG. 2C, the map data 200c is stored by specifying a road segment data record 209. The road segment data record 209 is configured to represent data that represents a road network. In FIG. 2C, the map database 105a contains at least one road segment data record 209 (also referred to as "entity" or "entry") for each road segment in a geographic region, such as the region shown by user interface 200a having feature lines 201 and 203, in FIG. 2A.

The map database 105a that represents the geographic region of FIG. 2A also includes a database record 211 (a node data record 211a and a node data record 211b) (or "entity" or "entry") for each node associated with the at least one road segment shown by the road segment data record 209. (The terms "nodes" and "segments" represent only one terminology for describing these physical geographic features and other terminology for describing these features is intended to be encompassed within the scope of these concepts). Each of the node data records 211a and 211b may have associated information (such as "attributes", "fields", etc.) that allows identification of the road segment(s) that connect to it and/or its geographic position (e.g., its latitude and longitude coordinates).

FIG. 2C shows some of the components of the road segment data record 209 contained in the map database 105a. The road segment data record 209 includes a segment ID 209a by which the data record can be identified in the map database 105a. Each road segment data record 209 has associated with it information (such as "attributes", "fields", etc.) that describes features of the represented road segment. The road segment data record 209 may include data 209b that indicate the restrictions, if any, on the direction of vehicular travel permitted on the represented road segment. The road segment data record 209 includes data 209c that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 209 may also include data 209d indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 209 also includes road grade data 209e that indicate the grade or slope of the road segment. In one embodiment, the road grade data 209e include road grade change points and a corresponding percentage of grade change. Additionally, the road grade data 209e may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 209e includes the road grade change points and an actual road grade value for the portion of the road segment after the road grade change point until the next road grade change point or end node. In a further embodiment, the road grade data 209e includes elevation data at the road grade change points and nodes. In an alternative embodiment, the road grade data 209e is an elevation model which may be used to determine the slope of the road segment.

The road segment data record 209 also includes data 209g providing the geographic coordinates (e.g., the latitude and longitude) of the end points of the represented road segment. In one embodiment, the data 209g are references to the node data records 209 that represent the nodes corresponding to the end points of the represented road segment.

The road segment data record 209 may also include or be associated with other data 209f that refer to various other attributes of the represented road segment. The various attributes associated with a road segment may be included in a single road segment record, or may be included in more than one type of record which cross-reference each other. For example, the road segment data record 209 may include data identifying the name or names by which the represented road segment is known, the street address ranges along the represented road segment, and so on.

FIG. 2C also shows some of the components of the node data record 211 contained in the map database 105a. Each of the node data records 211 may have associated information (such as "attributes", "fields", etc.) that allows identification of the road segment(s) that connect to it and/or it's geographic position (e.g., its latitude and longitude coordinates). For the embodiment shown in FIG. 2C, the node data records 211a and 211b include the latitude and longitude coordinates 211a1 and 211b1 for their nodes. The node data records 211a and 211b may also include other data 211a2 and 211b2 that refer to various other attributes of the nodes. In some embodiments, the node data records 211a and 211b may be associated with at least one first point and at least one second point, which may be border points of a feature line to be generated (such as the line 201 depicted in FIG. 2A) and at least one second line in vicinity of the feature line (or at least one first point) respectively.

Thus, the overall data stored in the map database 105a may be organized in the form of different layers for greater detail, clarity and precision. Specifically, in the case of high definition maps, the map data may be organized, stored, sorted and accessed in the form of three or more layers. These layers may include road level layer, lane level layer and localization layer. The data stored in the map database 105a in the formats shown in FIGS. 2B and 2C may be combined in a suitable manner to provide these three or more layers of information. In some embodiments, there may be lesser or fewer number of layers of data also possible, without deviating from the scope of the present disclosure.

FIG. 2D illustrates a block diagram 200d of the map database 105a storing map data or geographic data 217 in the form of road segments/links, nodes, and one or more associated attributes as discussed above. Furthermore, attributes may refer to features or data layers associated with the link-node database, such as an HD lane data layer.

In addition, the map data 217 may also include other kinds of data 213. The other kinds of data 213 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The map database 105a also includes indexes 215. The indexes 215 may include various types of indexes that relate the different types of data to each other or that relate to other aspects of the data contained in the geographic database 105a.

The data stored in the map database 105a in the various formats discussed above may help in provide precise data for high definition mapping applications, autonomous vehicle navigation and guidance, cruise control using ADAS, direction control using accurate vehicle maneuvering and other such services. In some embodiments, the system 101 accesses the map database 105a storing data in the form of various layers and formats depicted in FIGS. 2B-2D, to generate a feature line having missing parts.

FIG. 3 illustrates a block diagram 300 associated with the system 101, for providing capabilities for generating a feature line, in accordance with an embodiment disclosed herein.

The system 101 may include at least one processor 301, a memory 303, and at least one communication interface 305. The at least one processor 301 may comprise a connectivity detection module 301a, an orientation data generation module 301b, a candidate points identification module 301c, and a feature line generation module 301d.

The connectivity detection module 301a may be configured to determine connectivity data for the feature line based on at least one first point associated with the feature line and at least one second line, wherein the at least one second line is within a maximum distance from the at least one first point. The connectivity detection module 301a and its associated functionality will be discussed in conjunction with the description of FIG. 4 provided herein. FIG. 4 illustrates a diagrammatic representation 400 of different types of feature lines. The different feature lines include a line 400a; a line 400b; a line 400c; a line 400d; and a line 400e. Any of the feature lines may be at least one of a disconnected (or discontinuous) line and a continuous line. Further, any feature line may be disconnected from either one or both sides. For example, line 400e is disconnected from one side, such as an upper side, while it is connected to line 400b on the other side, such as a lower side. Here, there is a missing part or line segment between line 400a and line 400e, which needs to be completed, and a completed feature line needs to be generated. The completed feature line will then be formed by a continuous line including line 400b, line 400e, and line 400a.

Further, when we are generating the complete feature line, line 400*a* may be used to perform evaluations for generating the feature line. This may be identified based on sensor data about the feature line 400*a*, and the border 401. To that end, such evaluations may be performed for each border point in the sensor data. In such a case, line 400*a* comprises a border point 401 which forms the at least one first point associated with the feature line—line 400*a* (hereinafter referred to as feature line 400*a*), and any of the lines from line 400*b*-line 400*e* are nearby lines or lines in vicinity of the feature line 400*a*. Each of these nearby lines may be within a maximum distance from the border point 401. Further the line 400*e* comprises a point 403, in vicinity of the border point 401, such that point 403 is within a maximum distance from the border point 401. Thus, the point 403 is identified as the at least one second point and is associated with the at least one second line which is formed by line 400*e* (hereinafter referred to as at least one second line 400*e*). Thus, the at least one first point 401 and the at least one second point 403 are border points corresponding to the feature line 400*a* and the at least one second line 400*e* respectively, and the at least one second point 403 is within the maximum distance of the at least one first point 401.

The connectivity determination module 301*a* may be configured to determine the connectivity data for the feature line 400*a* by calculating first distance data for a distance between the at least one first point 401 and each of one or more nearby points (all points are not shown in the FIG. 4, only point 403 is shown for the sake of clarity), wherein each of the one or more nearby points are border points of one or more nearby lines, such that the one or more nearby lines are within the maximum distance of the feature line 400*a*, and the at least one second point 403 is one of the one or more nearby points and the at least one second line 400*e* is one of the one or more nearby lines. Further, the connectivity determination module 301*a* may be configured to compare the calculated first distance data for each of the one or more nearby points with the maximum distance.

To judge the connectivity, we need to set the maximum distance as a preconfigured data value which gives a correct judge about the connectivity of the feature line 400*a*. This preconfigured data value may be identified based on experimental results. If the minimum distance between border point 401 in the feature line 400*a* and other lines 400*b*-400*e* (which may be nearby lines of the feature line 400*a*) is larger than the maximum tolerance distance, we take that line as disconnected. The nearby lines may be identified on the basis of a feature line dataset, which is a dataset of all feature lines which located in vicinity of a location associated with the feature line 400*a*. To that end, feature line data (such as lane marking data) may comprise datasets which are grouped together or clustered together on the basis of locations. These locations may be locations identified on the basis of one or more GPS points, such as points 401, 403 and the like. Further, the locations may have associated feature lines with them, as part of the datasets. For example, the feature line 400*a* may be associated with point 401, the feature line 400*e* may be associated with point 403 and the like, and they all form a single feature line dataset. Thus, nearby lines of the feature line 400*a* are then identified from this feature line dataset, based on comparing location of the feature line (such as GPS location of point 401 associated with the feature line 400*a*) with all other feature line locations in the same dataset.

Further, after identifying the nearby lines (and their corresponding border points as nearby points), the connectivity determination may be performed as discussed above, by checking the distance between the feature line 400*a* and each of the one or more nearby lines, and checking whether this distance is between the maximum distance specified above. Thus, the connectivity determination module 301*a* is configured to determine the connectivity data for the feature line 400*a* based on the comparison of the first distance data for the distance between the at least one first point 401 and each of one or more nearby points. When the calculated first distance is not within the maximum distance for at least one of the one or more nearby points, then the feature line 400*a* is determined to be a disconnected line. For example, for the feature line 400*a*, the distance between the border point 401 and the point 403 of the second line 405*e* is calculated. If this distance is more than the maximum tolerance distance (which may have a pre-configured value, such as 2 km), then the connectivity determination module 301*a* determines the feature line 400*a* to be a disconnected line.

However, when the calculated first distance is within the maximum distance for each of the one or more nearby points, the feature line 400*a* may be a continuous line, having no missing parts.

There may be a number of reasons for the feature line 400*a* to be disconnected. These may include such as the border points of two otherwise connected lines (such as lines 400*a* and 400*e*) may sometimes not be the same due to errors in GPS detection data, also referred to as GPS fluctuations. Rather these points may be separated by a short distance, giving rise to missing parts between these points.

In other embodiments, a feature line may have redundant lines in parallel whose border can be very close, giving rise to discontinuities.

These discontinuities are detected by the connectivity determination module 301*a* using the operations described above, and may be used further in conjunction with the operations of the other modules to generate the missing parts of the feature lines determined as disconnected.

The orientation data generation module 301*b* may be configured to generate orientation data associated with the at least one first point 401 and the at least one second point 403 associated with the at least one second line 405*e*, in response to determining the connectivity data for the feature line 400*a*. The orientation data may correspond to the heading data associated with any of the points, such as point 401 and point 403. The heading data in turn provides an indication of the angle or direction of a vector associated with the point, which is measured in a direction due north. In some embodiments, the heading data may provide an indication of direction of travel of the vehicle in which the system 101 is installed, and which is configured to travel along one or more links or road segments associated with the detection of feature line data. However, using these already existing points, such as 401 and 403, orientation may be generated using the operations described below, as performed by the orientation data module 301*b*.

The feature line data 400*a* in the system 101 may not include information associated with heading of the feature line 400*a*. That makes it difficult to pair with an existing link or nearby line to complement its missing part. Therefore, using the orientation data generation module 301*b*, the system 101 is configured to generate a first orientation data for each of the one or more nearby points of the feature line 400*a* based on the at least one first point, that is the border point 401 and the corresponding each of the one or more nearby points, wherein the first orientation data is associated with a direction pointing outward from the at least one first point towards the corresponding nearby point. The orientation data is generated only between the points which are at ends or are outer points for any of the one or more nearby points. This will be explained in conjunction with FIGS. 5, 6A and 6B.

FIG. 5 illustrates a feature line 500 having a plurality of points under consideration for orientation data generation. A feature line is constituted of several GPS points. The heading or the first orientation data at the beginning and end of the feature line can be generated by the border lines and their nearest points. These headings can be employed to complement the missing parts between the feature lines. The feature line 500 comprises plurality of GPS points including: a point 501, a point 503, a point 505, a point 507, and a point 509. Each of these points 501-509 correspond to nodes or endpoints which further correspond to intersection points of their corresponding line segments, or link segments, which were described in FIG. 2B and FIG. 2C. For orientation data generation, only the points 501 and 509 are considered, as they are at ends of the link segment or feature line defined between the points 501 and 509. This is because the feature line 500 is not directional and not map-matched, therefore only the headings or orientation data always pointing to the outside of the feature line 500 are generated. The orientation data is generated in a direction outwards from each of the points 501 and 509 towards one or more nearby points of one or more nearby lines, such that these nearby points would also be end points associated with their corresponding nearby lines. This is further shown in detail in FIG. 6A.

FIG. 6A illustrates an exemplary scenario 600a for generating a feature line, in accordance with one or more embodiments. The scenario 600a illustrates at least five feature lines 600a1, 600a2, 600a3, 600a4 and 600a5, and plurality of border points 601, 603, 605, 607, 609, 611, 613, 615, 617, and 619 associated with the lines 600a1-600a5.

For example, the feature line 600a1 extends between the border points 601 and 617. The feature line 600a2 extends between the border points 603 and 619. The feature line 600a3 extends between the border points 605 and 607. The feature line 600a4 extends between the border points 609 and 611. The feature line 600a5 extends between the border points 613 and 615. The border point 601 may be considered analogous to the at least one first point 401 (and feature line 400a analogous to feature line 600a1) and the border point 603 may be considered analogous to the at one second point 403 (and feature line 400e analogous to feature line 600a2) shown in FIG. 4, for the purpose of explanation of the exemplary scenario 600a. Each of the feature lines 600a2-600a5 may lie within the maximum distance (defined earlier) from the border point 601, and are thus considered nearby lines of the border point 601. Further, each of the corresponding border points of these nearby lines 600a2-600a5 may be considered the one or more nearby points of the border point 601.

The orientation data generation module 301b is configured to generate a first orientation data for each of the one or more nearby points of the feature line 600a1 based on the at least one first point, that is the border point 601 and the corresponding each of the one or more nearby points (here points 603, 605, 607, 609, 611, 613, and 615 are nearby points for the purposes of explanation), wherein the first orientation data is associated with a direction pointing outward from the at least one first point towards the corresponding nearby point. The first orientation data represents an angular displacement of a vector drawn outwards towards each of the one or more nearby points from the at least one first point 601, with respect to the direction of the at least one first point 601 pointing due north. For example, the first orientation data for point 611 is represented as $\theta_1$ and the first orientation data for the point 609 is represented as $\theta_2$ for explanatory purpose. Similarly, the first orientation data for each of the one or more nearby points may be generated.

Based on the first orientation data, the orientation data generation module 301b is further configured to generate the orientation data associated with the at least one first point 601 and (point 401 of FIG. 4) and the at least one second point 603 (point 403 of FIG. 4) based on the first orientation data identified for all the nearby points. Out of this first data of each nearby point, the orientation data of the at least one second point 603 is selected as the orientation data under consideration, which will explained in the following description.

Once the orientation data is generated in this way, the system 101 is further configured to determine one or more candidate points from the nearby points 603-609, using the candidate points identification module 301c. As already discussed, the connectivity detection module 301b is configured to calculate first distance data for a distance between the at least one first point 401 and each of one or more nearby points. With reference to FIG. 6A, this first distance is represented by distance values: d1 (distance between point 601 and 605); d2 (distance between point 601 and 607); d3 (distance between point 601 and 609); d4 (distance between point 601 and 611); d5 (distance between point 601 and 603); d6 (distance between point 601 and 615); and d7 (distance between point 601 and 613). Out of these first distance values, one of the distance values, d5, corresponds to the distance data for distance between the at least one first point 601 (point 401 of FIG. 4) and the at least one second point 603 (point 403 of FIG. 4). The first distance data values d1-d7, along with first orientation data values calculated by the orientation data module for each of the nearby points 603-615 are used to identify one or more candidate points by the candidate points identification module 301c.

The candidate points identification module 301c may be configured to determine an orientation data threshold (h) that specifies a threshold value for the orientation data. For example, the orientation data threshold may be set to 45 degrees. Therefore, an orientation separation value of −45 degrees to +45 degrees may be considered to be within the orientation data threshold value.

The candidate points identification module 301c may also be configured to determine a distance data threshold (d) that specifies a threshold value for the distance data. For example, the distance data threshold may be set to 2 km. Therefore, a distance separation value separation lesser than or equal to 2 km may be considered to be within the distance data threshold value.

In addition, candidate points identification module 301c may be configured to identify lane width data associated with width of lane on which the feature line 600a1 (feature line 400a of FIG. 4) and 600a2 (feature line 400E of FIG. 4) are located. The lane width data may be identified based on some other algorithm not disclosed herein. In some embodiments, the lane width data is obtained from the map database 105a.

The candidate points identification module 301c may be configured to adjust the distance data threshold (d) and the heading data threshold (h), by using the lane width data. For example, the distance data threshold (d) and the heading data threshold (h), and the lane width data may be configured in such a way that they satisfy the constraint defined by the equation (1) below:

$$h*d*pi/180 <= \text{lane width data} \qquad \text{Equation (1)}$$

The relation between the distance data threshold (d), the heading data threshold (h) and the lane width data is illustrated for more clarity by the illustration 600b of FIG. 6B. As shown in FIG. 6B, based on the equation (1), there can be two different areas identified near the point 601, a valid search area and an invalid search area, which are shown by different patterns. Within these areas, the one or more candidate points may be identified by the operations performed by the candidate points identification module as described in following description.

The constraint defined by equation (1) helps to ensure two things: 1) connecting of feature lines in nearby lines (or lane markings) are avoided while generating an incomplete feature line, and 2) distance data threshold (d) may suitably adjusted if sensor data (available to the system 101) is sparse.

In some embodiments, the equation (1) may be used to set the values of the distance data threshold (d) and the orientation data threshold (h) in advance by adding some trade-off parameters, which depends on the type of navigation product, application or algorithm for which the feature line data may be used.

In some embodiments, the equation (1) may be used in conjunction with other constrains to set the values of the distance data threshold (d) and the orientation data threshold (h).

In some embodiments, the value of the heading data threshold (h) may be adapted to the values of the distance data threshold (d) and current lane width, without using the equation (1). For example, in some cases either longer distance threshold (d) or narrower lane width may result into smaller heading difference, and vice versa.

Once the distance data threshold (d) and orientation data threshold (h) have been identified by any of the ways described above, the candidate points identification module 301c is configured to compare the first distance data for distance between the at least one first point 601 and each of one or more nearby points 603-615 with the distance data threshold (d).

Each of the distances d1-d7 are compared with d and based on the result of the comparison, the corresponding nearby point is identified as a valid candidate point or an invalid candidate point. If the first distance data for the corresponding nearby point is within the distance data threshold (d) then the nearby point is identified at the one or more candidate points for further calculations and is thus a valid candidate point. However, if the first distance data for the corresponding nearby point is not within the distance data threshold (d) then the nearby point cannot be used as the one or more candidate points for further calculations and is thus an invalid candidate point.

Further, the first orientation data for each of the one or more nearby points is compared with the orientation data threshold (h) and based on the result of the comparison, the corresponding nearby point is identified as a valid candidate point or an invalid candidate point. If the first orientation data for the corresponding nearby point is within the orientation data threshold (h) then the nearby point is identified at the one or more candidate points for further calculations and is thus a valid candidate point. However, if the first orientation data for the corresponding nearby point is not within the orientation data threshold (h) then the nearby point cannot be used as the one or more candidate points for further calculations and is thus an invalid candidate point.

Thus, from the nearby points 603-615 the one or more candidate points are identified in this manner. For example, in FIG. 6A, the points 605-615 are the invalid candidate points and point 603 is the valid candidate point. Thus, after the operations performed med by the candidate points identification module 301c, the point 603 is left as the only candidate point for further calculations. However, the example shown in FIG. 6A is only one possible implementation of the present system 101 operation. In other implementations and embodiments, more than one candidate points may be identified by the candidate point identification module 301c associated with the system 101. In that case, the candidate point identification module 301 is further configured to choose only that one point from those more than one candidate points which has shortest distance separation from the point 601, or which has minimum orientation separation from the point 601, or both.

Thus, based on any of the implementations described above, the candidate point identification module 301c identifies at least one second point 603 (point 403 of FIG. 4), satisfying all the criteria described above.

Further, the feature line generation module 312 may be configured to generate a connecting line for the feature line 600a1 (feature line 400a of FIG. 4) based on the at least one first point, the at least one second point, the orientation data and the distance data, as described above. The feature line generation module 312 is configured to connect the at least one first point 601 with the at least one second point 603 via a line segment. Further, the generated feature line then comprises a continuous line from point 619 to 617, and this generated feature line may then be updated by updating its corresponding link data record 205, node data record 211 and road segment data record 209 stored in map database 105a.

According to some embodiments, each of the modules 301a-301d may be embodied in the processor 301. The processor 301 may retrieve computer program code instructions that may be stored in the memory 303 for execution of computer program code instructions, which may be configured for determining the driving direction.

The processor 301 may be embodied in a number of different ways. For example, the processor 301 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 301 may include one or more processing cores configured to perform independently. A multi-core processor may enable multiprocessing within a single physical package. Additionally, or alternatively, the processor 301 may include one or more processors configured in tandem via the bus to enable independent execution of instructions, pipelining and/or multithreading.

Additionally, or alternatively, the processor 301 may include one or more processors capable of processing large volumes of workloads and operations to provide support for big data analysis. In an example embodiment, the processor 301 may be in communication with the memory 303 via a bus for passing information to mapping platform 105. The memory 303 may be non-transitory and may include, for example, one or more volatile and/or non-volatile memories. In other words, for example, the memory 303 may be an electronic storage device (for example, a computer readable storage medium) comprising gates configured to store data (for example, bits) that may be retrievable by a machine (for example, a computing device like the processor 301). The memory 303 may be configured to store information, data, content, applications, instructions, or the like, for enabling the system 101 to carry out various functions in accordance with an example embodiment of the present invention. For example, the memory 303 may be configured to buffer input data for processing by the processor 301. As exemplarily illustrated in FIG. 3, the memory 303 may be configured to store instructions for execution by the processor 301. As such, whether configured by hardware or software methods, or by a combination thereof, the processor 301 may represent an entity (for example, physically embodied in circuitry) capable of performing operations according to an embodiment of the present invention while configured accordingly. Thus, for example, when the processor 301 is embodied as an ASIC, FPGA or the like, the processor 301 may be specifically configured hardware for conducting the operations described herein. Alternatively, as another example, when the processor 301 is embodied as an executor of software instructions, the instructions may specifically configure the processor 301 to perform the algorithms and/or operations described herein when the instructions are executed. However, in some cases, the processor 301 may be a processor specific device (for example, a mobile terminal or a fixed computing device) configured to employ an embodiment of the present invention by further configuration of the processor 301 by instructions for performing the algorithms and/or operations described herein. The processor 301 may include, among other things, a clock, an arithmetic logic unit (ALU) and logic gates configured to support operation of the processor 301.

In some embodiments, the processor 301 may be configured to provide Internet-of-Things (IoT) related capabilities to users of the system 101, where the users may be a traveler, a driver of the vehicle and the like. In some embodiments, the users may be or correspond to an autonomous or semi-autonomous vehicle. The IoT related capabilities may in turn be used to provide smart navigation solutions by providing real time updates to the users to take pro-active decision on wrong way driving determination, speed determination, lane-level speed determination, turn-maneuvers, lane changes, overtaking, merging and the like, big data analysis, autonomous vehicle maneuvering and control and sensor-based data collection by using the cloud based mapping system for providing navigation recommendation services to the users. The system 101 may be accessed using the communication interface 305. The communication interface 305 may provide an interface for accessing various features and data stored in the system 101. For example, the communication interface 305 may comprise I/O interface which may be in the form of a GUI, a touch interface, a voice enabled interface, a keypad, and the like. For example, the communication interface 305 may be a touch enabled interface of a navigation device installed in a vehicle, which may also display various navigation related data to the user of the vehicle. Such navigation related data may include information about upcoming conditions on a route, route display, alerts about vehicle speed, user assistance while wrong way driving, and the like.

FIG. 7 is a flowchart of a method 700 for generating a feature line, in accordance with one or more example embodiments described above. The method 700 will be discussed in conjunction with FIG. 4 and FIG. 6A, and appropriate references may be used interchangeably wherever required, without deviating from the scope of the present disclosure.

The method 700 comprises, at step 701, determining at least one first point associated with a feature line. For example, at step 701 the at least one first point 601, which is a border point of the feature line 600a1, is determined. This determination may be made on the basis of sensor data, such as sensor data images obtained from one or more vehicle sensors. The at least one first point 601 may be determined from one or more images associated with the feature line as the border point corresponding to an observed discontinuity in the feature line 600a1.

The method 700 comprises, at step 703, determining one or more candidate points associated with one or more nearby lines of the feature line based on first distance data and first orientation data. For The first distance data and first orientation data may correspond to distance between the at least one first point 601 and each of the one or more nearby points 603-615, as discussed in conjunction with FIG. 6A. Also, each of the one or more nearby points 603-615 may be within the maximum distance of the at least one first point 601.

Further, to determine the one or more candidate points, the method 700 may further comprise generating the first orientation data for each of the one or more nearby points based on the at least one first point and the corresponding each of the one or more nearby points. For example, the orientation data generation module 301b of the system 101 may be configured to generate the first orientation data for each of the nearby points 603-615 by generating a vector with a direction pointing outward from the at least one first point 601 towards the corresponding nearby point, and measuring the orientation separation between the at least one first point 601 and each of the nearby points 603-615. This is already explained previously in conjunction with FIG. 6A.

Further, to determine the one or more candidate points, the method 700 may further include comparing the calculated first distance data for each of the one or more nearby points with the distance data threshold (d); and comparing the generated first orientation data for each of the one or more nearby points with the orientation data threshold (h). Then, based on the comparison, a point is taken as a (valid) candidate point when the first orientation data for the point is within the orientation data threshold (h), and the first distance data for each of the one or more candidate points is within the distance data threshold (d).

Additionally, in some embodiments, to determine the one or more candidate points the method 700 may include determining lane width data associated with the feature line. The lane width data may then be used along with distance data threshold (d) and orientation data threshold (h) to check whether all these three entities satisfy the constraint specified in equation (1) earlier.

Once the one or more candidate points have been identified, the method 700 includes, at 705, identifying the at least one second point (such as point 603) is identified from the one or more candidate points such that the orientation data associated with the at least one second point is minimum orientation data (shortest orientation separation) among the first orientation data of each of the one or more candidate points, and the distance data associated with the at least one second point is minimum distance data (shortest distance separation) among the first distance data of each of the one or more candidate points.

The method 700 may include, at step 707, generating a connecting line for the feature line (such as the line 600a1) based on the at least one first point and the at least one second point. The connecting line may be generated by drawing a line segment between the at least one first point (such as point 601) and the at least one second point (such as the point 603), so as to complete the missing part of the feature line 600a1.

In some embodiments, the method 700 may further include updating the map database 105a based on the generated feature line, so that the map database 105a reflects accurate and up-to-date data about the feature line 600a1. The feature line 600a1 may associated with lane markings on a link, so updating the map database 105a may further comprise updating lane level records, link level records and road geometry level records and even node level records for accuracy.

In some embodiments, the steps 703-707 of the method 700 may be performed in response to determining connectivity data for the feature line 600a1. To determine the connectivity data for the feature line, the first distance data for each of the one or more nearby points is compared with the maximum distance based. Then based on the comparison, the connectivity data is identified to indicate at least one of: the feature line is a disconnected line when the calculated first distance is not within the maximum distance for at least one of the one or more nearby points, and the feature line is a continuous line when the calculated first distance is within the maximum distance for each of the one or more nearby points. The steps 703-707 may be performed when the connectivity data indicates that the feature line is a disconnected line.

It will be understood that each block of the flow diagram of the method 700 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 303 of the system 101, employing an embodiment of the present invention and executed by the processor 301. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 700 support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

FIG. 8 is a flowchart of another method 800 for generating a feature line, in accordance with another embodiment.

The method 800 may include, at step 801, generating orientation data associated with the feature line and at least one second point associated with at least at least one second line. For example, the feature line 600a1 may be determined (by sensor data) to have a border point 601, indicating that there is a discontinuity in the feature line 600a1. Further, it may be determined that there are other feature lines having their corresponding border points in vicinity (that is within the maximum distance specified earlier) of the border point 601. Out of these corresponding border points of the other feature lines, one of the lines may be the at least one second line (such as the line 600a2 having the border point 603, which may then be considered as the at least one second point). Here, using the features and operations of the orientation data generation module 301b described in FIG. 3, the orientation data associated with the feature line 600a1 and at least one second point 603 associated with at least at least one second line 600a2 is determined.

Further, at step 803, distance data associated with distance between the at least one first point and the at least one second point is determined. As already discussed, the at least one second point, such as the point 603, is identified from one or more candidate points. The one or more candidate points are in turn selected from one or more nearby points of the feature lines, such as the line 600a1.

For this, the operations described by method 800 also comprise calculating first distance data for a distance between the at least one first point, such as the point 601, and each of one or more nearby points, such as the points 603-615, wherein each of the one or more nearby points are border points of one or more nearby lines, such as the lines 600a2-600a5, which are within the maximum distance from the at least one first point. Further, the operations associated with the method 800 may comprise generating first orientation data for each of the one or more nearby points based on the at least one first point and the corresponding each of the one or more nearby points, wherein the first orientation data is associated with a direction pointing outward from the at least one first point towards the corresponding nearby point.

Then, the method 800 may include, at step 805, generating a connecting line for the feature line based on the at least one first point (601) and the at least one second point (603) when the orientation data is within the orientation data threshold (h) and the distance data is within the distance data threshold (d). For this, the operations include comparing the calculated first distance data for each of the one or more nearby points with the distance data threshold (d) and comparing the generated first orientation data for each of the one or more nearby points with the orientation data threshold (h). Further, the operations associated with the method 800 may include determining one or more candidate points from the one or more nearby points such that: the first orientation data for each of the one or more candidate points is within the orientation data threshold (h), and the first distance data for each of the one or more candidate points is within the distance data threshold (d).

The operations associated with the method 800 may further include identifying the at least one second point from the one or more candidate points such that at least: the orientation data associated with the at least one second point is minimum orientation data among the first orientation data of each of the one or more candidate points, and the distance data associated with the at least one second point is minimum distance data among the first distance data of each of the one or more candidate points, or both.

As already discussed, the identification of the candidate points (such as points 603-615) and the identification of the at least one second point (such as the point 603) may be done by the candidate points identification module 301c associated with the system 101.

Further, generation of the feature line at step 805 may be accomplished by the feature line generation module associated with the system 101.

It will be understood that each block of the flow diagram of the method 800 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 303 of the system 101, employing an embodiment of the present invention and executed by the processor 301. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 800 support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

Further using any of the methods described in the accompanying embodiments of the flowcharts shown in FIG. 7 and FIG. 8, which implement the various functionalities of the system 101 described in FIG. 3, the accuracy of the map data may be highly improved. This is specifically advantageous in cases of map data related to lane markings, which may have discontinuities due to any of the reasons discussed previously. This is particularly useful for high definition maps which are used for autonomous driving vehicles, as the system 101 improves the quality of map data stored in map database 105a, thereby leading to more accurate, safe and reliable decision making for autonomous driving scenarios.

The improvement in the quality of map data by using the methods (700 and 800) and system 101 disclosed herein may be observed by the exemplary user interfaces shown in FIGS. 9A-9B, depicting map data used for generating mapping display on a high definition map installed in a vehicle.

FIG. 9A illustrates an exemplary user interface showing lane marking data displayed on the mapping display 900a of a high-definition map (associated with map database 105a) installed in a vehicle before using the systems and methods disclosed in accordance with one or more example embodiments. As can be observed from the mapping display 900a, there are a number of discontinuities in the lane marking data.

Further, FIG. 9B illustrates the exemplary user interface showing lane marking data on a mapping display 900b of the high-definition map (associated with map database 105a) after using the systems and methods disclosed in accordance with one or more example embodiments. As can be clearly observed, there are no discontinuities in the lane marking data on the mapping display 900b thereby showing efficacy, accuracy and usefulness of the methods and system disclosed in the various embodiments described herein. Further, when the vehicle associated with the mapping display 900b is an autonomous vehicle (that is capable of sensing its environment and operating without human involvement), the safety and reliability of navigation of the autonomous vehicle is highly improved and better maneuvering and control of the autonomous vehicle may be possible.

Additionally, the vehicle may include a motor vehicle, a non-motor vehicle, an automobile, a car, a scooter, a truck, a van, a bus, a motorcycle, a bicycle, a Segway, and/or the like. The vehicle may be a semiautonomous vehicle, or even a manual vehicle. In various embodiments, the vehicle may be equipped with various sensors for generating or collecting sensor data. For instance, the sensors of the vehicle 301 may include a radar system, a LiDAR system, a global positioning sensor for gathering location data (e.g., GPS coordinates), temporal information sensors, orientation sensors augmented with height sensors, tilt sensors, image sensors, and the like. In some example embodiments, the sensor data may be generated and reported to the system 101, at a predefined frequency. For instance, the predefined frequency may be as high as one hertz, based on the capabilities of the sensors. In any which way, the vehicle may be able to gain advantage of the system 101 and methods 700 and 800, irrespective of the type of the vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system for generating a feature line, the system comprising:
a memory configured to store computer-executable instructions; and
at least one processor configured to execute the computer-executable instructions to:
receive sensor data indicating a first feature line and one or more second feature lines separated from the first feature line;
process the sensor data to determine connectivity data for the first feature line with respect to the one or more second feature lines, wherein the connectivity data indicate whether the one or more second feature lines is at least partially within a maximum distance from a first point associated with the first feature line;
generate orientation data associated with the first point and one or more second points associated with the one or more second lines;
generate a connecting line connecting the first feature line and one of the one or more second feature lines based on the first point, the one or more second points, the generated connectivity data, and the generated orientation data;
update a map database based on the generated connecting line; and
cause a navigation application on a user interface to present the generated connecting line.

2. The system of claim 1, wherein the first feature line and the one or more second feature lines are associated with lane marking data of the map database.

3. The system of claim 1, wherein the first point and the one or more second points are border points corresponding to the first feature line and the one or more second feature lines, respectively.

4. The system of claim 3, wherein, to determine the connectivity data, the at least one processor is configured to:
calculate first distance data indicating a distance between the first point and each of the one or more second points;
compare the calculated distance with the maximum distance;
responsive to the calculated distance being equal to or greater than the maximum distance for each of the one or more second points, generate the connectivity data to indicate that the first feature line is disconnected from the one or more second feature lines; and
responsive to the calculated distance being less than the maximum distance for each of the one more second points, cause the connectivity data to indicate that the first line is potentially connected to any one of the one or more second feature lines.

5. The system of claim 4, wherein to generate the orientation data, the at least one processor is further configured to:
generate a first orientation data for each one of the one or more second points based on the first point and the one or more second points, wherein the first orientation data is associated with a direction pointing outward from the first point towards said one of the one or more second points; and
generate the orientation data associated with the first point and the one or more second points based on the first orientation data.

6. The system of claim 5, wherein the at least one processor is further configured to:
compare the first orientation data for each of the one or more second points with an orientation data threshold (h);
compare the first distance data for distance between the first point and each of the one or more second points with a distance data threshold (d); and
identify one or more candidate points from the one or more second points such that:
the first orientation data for each of the one or more candidate points is within the orientation data threshold (h), and
the first distance data for each of the one or more candidate points is within the distance data threshold (d).

7. The system of claim 6, wherein the at least one processor is further configured to:
determine lane width data associated with the first feature line; and
identify the one or more candidate points based on the lane width data, the orientation data threshold (h), and the data distance threshold (d).

8. The system of claim 6, wherein the at least one processor is further configured to:
responsive to the one or more candidate points being a plurality of candidate points, identify one of the plurality of candidate points such that
the one of the plurality of candidate points includes the minimum orientation separation from the first point among the plurality of candidate points,
the one of the plurality of candidate points includes the shortest distance separation from the first point among the plurality of candidate points, or a combination thereof; and
use the one of the plurality of candidate points as one of the one or more second points corresponding to the one of the one or more second feature lines that connects to the connecting line; and
responsive to the one or more candidate points being a single candidate point, use the single candidate point as the one of the one or more second points corresponding to the one of the one or more second feature lines that connects to the connecting line.

9. A non-transitory computer-readable storage medium having computer program code instructions stored therein, the computer program code instructions, when executed by at least one processor, cause the at least one processor to:
receive sensor data indicating a first feature line and one or more second feature lines separated from the first feature line;
process the sensor data to determine connectivity data for the first feature line with respect to the one or more second feature lines, wherein the connectivity data indicate whether the one or more second feature lines is at least partially within a maximum distance from a first point associated with the first feature line;
generate orientation data associated with the first point and one or more second points associated with the one or more second lines;
generate a connecting line connecting the first feature line and one of the one or more second feature lines based on the first point, the one or more second points, the generated connectivity data, and the generated orientation data;

update a map database based on the generated connecting line; and cause a navigation application on a user interface to present the generated connecting line.

10. The non-transitory computer-readable storage medium of claim 9, wherein the feature line and the one or more second feature lines are associated with lane marking data of the map database.

11. A method comprising:

receiving sensor data indicating a first feature line and one or more second feature lines separated from the first feature line;

processing the sensor data to determine connectivity data for the first feature line with respect to the one or more second feature lines, wherein the connectivity data indicate whether the one or more second feature lines is at least partially within a maximum distance from a first point associated with the first feature line;

generating orientation data associated with the first point and one or more second points associated with the one or more second lines;

generating a connecting line connecting the first feature line and one of the one or more second feature lines based on the first point, the one or more second points, generated connectivity data, and the generated orientation data;

updating a map database based on the generated connecting line; and causing a navigation application on a user interface to present the generated connecting line.

12. The method of claim 11, wherein the feature line and the one or more second feature lines are associated with lane marking data of the map database.

* * * * *